United States Patent [19]
Goodhue, Jr. et al.

[11] Patent Number: 5,663,123
[45] Date of Patent: Sep. 2, 1997

[54] POLYMERIC EARTH SUPPORT FLUID COMPOSITIONS AND METHOD FOR THEIR USE

[75] Inventors: K. Gifford Goodhue, Jr., Spring; Max M. Holmes, Dallas, both of Tex.

[73] Assignee: KB Technologies Ltd., Spring, Tex.

[21] Appl. No.: 382,121

[22] Filed: Feb. 1, 1995

Related U.S. Application Data

[63] Continuation-in-part of Ser. No. 20,345, Feb. 19, 1993, Pat. No. 5,407,909, which is a continuation-in-part of Ser. No. 914,441, Jul. 15, 1992, abandoned.

[51] Int. Cl.$^6$ .......................... E21B 33/14; E21B 33/138; C09K 7/04
[52] U.S. Cl. .......................... 507/225; 507/221; 507/220; 507/118; 507/122; 507/120; 507/121
[58] Field of Search .................................. 507/224, 225, 507/221, 220

[56] References Cited

U.S. PATENT DOCUMENTS

| | | | |
|---|---|---|---|
| 3,652,497 | 3/1972 | Junas et al. | 260/47 |
| 3,657,175 | 4/1972 | Zimmerman et al. | 260/29.6 |
| 3,726,342 | 4/1973 | Rhudy et al. | 166/275 |
| 3,794,608 | 2/1974 | Evani et al. | 260/29.6 |
| 3,878,151 | 4/1975 | Dachs et al. | 260/29.6 |
| 3,894,980 | 7/1975 | DeTommaso | 260/29.6 |
| 3,915,921 | 10/1975 | Schlatzer | 260/17.4 |
| 4,076,628 | 2/1978 | Clampitt | 252/8.5 |
| 4,138,381 | 2/1979 | Chang et al. | 260/29.6 |
| 4,167,502 | 9/1979 | Lewis et al. | 260/29.6 |
| 4,268,641 | 5/1981 | Koenig et al. | 525/367 |
| 4,338,239 | 7/1982 | Dammann | 524/549 |
| 4,384,096 | 5/1983 | Sonnabend | 526/313 |
| 4,421,902 | 12/1983 | Chang et al. | 526/317 |
| 4,476,190 | 10/1984 | Clarke et al. | 428/350 |
| 4,500,436 | 2/1985 | Pabley | 252/8.5 |
| 4,506,062 | 3/1985 | Flesher et al. | 526/211 |
| 4,514,552 | 4/1985 | Shay et al. | 526/301 |
| 4,526,937 | 7/1985 | Hsu | 524/724 |
| 4,554,018 | 11/1985 | Allen | 106/20 |
| 4,554,298 | 11/1985 | Farrar et al. | 523/336 |
| 4,554,307 | 11/1985 | Farrar et al. | 524/425 |
| 4,600,761 | 7/1986 | Ruffner et al. | 526/270 |
| 4,660,645 | 4/1987 | Newlove et al. | 166/304 |
| 4,669,920 | 6/1987 | Dymond | 405/264 |
| 4,670,501 | 6/1987 | Dymond et al. | 524/458 |
| 4,677,152 | 6/1987 | Allen et al. | 524/543 |
| 4,683,949 | 8/1987 | Sydansk et al. | 166/270 |
| 4,702,844 | 10/1987 | Flesher et al. | 210/733 |
| 4,722,397 | 2/1988 | Sydansk et al. | 166/295 |
| 4,724,906 | 2/1988 | Sydansk | 166/295 |
| 4,741,790 | 5/1988 | Hawe et al. | 156/71 |
| 4,743,698 | 5/1988 | Ruffner et al. | 549/478 |
| 4,744,418 | 5/1988 | Sydansk | 166/270 |
| 4,777,200 | 10/1988 | Dymond et al. | 524/458 |
| 4,816,551 | 3/1989 | Oehler et al. | 528/295.3 |
| 4,835,206 | 5/1989 | Farrar et al. | 524/457 |
| 4,844,168 | 7/1989 | Sydansk | 166/270 |
| 4,892,916 | 1/1990 | Hawe et al. | 526/304 |
| 4,911,736 | 3/1990 | Huang et al. | 44/51 |
| 4,981,398 | 1/1991 | Field et al. | 405/264 |
| 5,032,295 | 7/1991 | Matz et al. | 252/8.51 |

FOREIGN PATENT DOCUMENTS

| | | | |
|---|---|---|---|
| 2088344 | 10/1993 | Canada | C09K 7/02 |
| 1332502 | 10/1994 | Canada | C09K 7/02 |
| 0 160 427 A2 | 11/1985 | European Pat. Off. | C07C 67/03 |
| 0 165 004 A2 | 12/1985 | European Pat. Off. | A01C 3/00 |
| 0 194 857 A2 | 9/1986 | European Pat. Off. | C09J 3/00 |
| 0 634 468 A1 | 1/1995 | European Pat. Off. | C09K 7/02 |
| 1517422 | 7/1978 | United Kingdom | C02B 1/20 |
| 2221904 | 2/1990 | United Kingdom | C07C 29/15 |
| 2277759 | 9/1994 | United Kingdom . | |

*Primary Examiner*—David B. Springer
*Attorney, Agent, or Firm*—Arnold, White & Durkee

[57] ABSTRACT

This invention relates to an earth stabilization fluid and to a method for using such an earth stabilization fluid. This invention uses a continuous phase that has been added to a borehole and a polymer material that forms gel masses having desired functional properties when added to the continuous phase.

61 Claims, 15 Drawing Sheets

| Mix Time = 10 minutes<br>Hamilton Beach Mixer,<br>Speed-Controlled at Low Shear<br>(approx. 2500 rpm) | 40% Anionic<br>Dry PHPA, MW<br>25 million | 30% Anionic<br>Liquid<br>Emulsion<br>PHPA, MW<br>15 million | 30% Anionic<br>Dry PHPA, MW<br>25 million |
|---|---|---|---|
| Dosage, active polymer, grams/liter | 1.0 | 1.0 | 1.0 |
| Dosage, as received, grams/liter | 1.0 | 3.13 | 1.0 |
| Marsh Funnel Viscosity, sec/qt | 61 | 49 | 54 |
| Novel Dry Granular PHPA vs. Conventional Emulsion<br>PHPA and Dry Granular 30% Anionic PHPA<br><br>Higher aninioc charge and optimized surface treatment<br>yield greater viscosity than 30% anionic polymers.<br><br>"Active polymer" dosage ignores small percentage of moisture present<br>in dry-form polymers, and is thus approximate. ||||

FIG. 2

| Permeability = 20 darcies<br>Hydration Time = 30 minutes<br>differential pressure = 5 psi | 40% Anionic Dry PHPA, MW 25 million, Grain Size 1.5 mm | 30% Anionic liquid Emulsion PHPA, MW 15 million |
|---|---|---|
| Dosage, active polymer, grams/liter | 1.0 | 1.0 |
| Dosage, as received, grams/liter | 1.0 | 3.13 |
| Time (minutes) vs. Filtrate Vol. (mL) | | |
| 00:30 | 10 | 13 |
| 01:00 | 15 | 24 |
| 02:00 | 25 | 48 |
| 05:00 | 45 | 121 |
| 10:00 | 68 | 247 |
| 15:00 | 80 | 384 |
| 20:00 | 93 | 450 |
| 30:00 | 115 | 675 |
| Grain size is max. particle dimension.<br>Product contains smaller particles also. | | |

FIG. 4

POLYMERIC EARTH SUPPORT FLUID COMPOSITIONS AND METHOD FOR THEIR USE

CROSS-REFERENCE TO RELATED APPLICATIONS

The present application is a continuation-in-part of commonly-assigned, application Ser. No. 08/020,345 filed Feb. 19, 1993, now U.S. Pat. No. 5,407,969 which is is a continuation-in-part of commonly-assigned, application, Ser. No. 07/914,441, filed Jul. 15, 1992, now abandoned.

BACKGROUND OF THE INVENTION

1. Field of The Invention

This invention relates to polymer-based fluids for use in boring, excavating and trenching operations in the deep foundation construction industry, the subterranean construction industry, and in tunneling, in well drilling and in other applications of earth support fluids.

2. Description of Related Art

In creating foundations and shorings for buildings, bridges and other structures, and in excavating and subterranean boring for installation of utilities, barrier walls, transit ways and drainage systems, fluids have been used to support the surrounding earth during excavation operations. Whenever subterranean construction or excavation must be accomplished in granular, unstable, water-saturated or gas-charged earth formations, it has been customary to fill the boreholes, tunnel faces or excavations during the excavating or drilling process with water-based earth-support fluids, also known as slurries or muds. These fluids have consisted essentially of water, a thickening and/or filter-cake-building agent and earth solids from the excavation.

The conventional materials for making these fluids are clays such as bentonite and attapulgite. More recently, water-soluble polymers have been introduced and used in place of or in combination with such clays. (In this document "water-soluble", "soluble", "dissolved" and similar terms describing the "dissolution" of polymers refers to polymers that form either true solutions or colloidal dispersions. With regard to polymers, we use the concepts of water solubility and water dispersibility to colloidal dimensions interchangeably.) A widely used type of water-soluble polymer in these applications is a partially-hydrolyzed polyacrylamide (PHPA), in the form of a primarily linear, or non-crosslinked, long chain polymer with an anionic charge density of twenty to thirty mole weight. This type of polymer is available in liquid water-in-oil emulsion form and in dry form. Other polymers include guar gum, xanthan gum, cellulosic polymers, starch and blends of these. All of these polymers, including the PHPAs, have been prepared and applied in ways which are intended to accomplish complete dissolution or colloidal dispersion of the polymers when mixed with water to prepare earth support fluids.

With acrylic-polymer-based fluids containing no bentonite or other cake-building inorganic colloids, fluid loss control has been unattainable or poorly realized. The dissolved or colloidally dispersed water-soluble polymers, when selected and used according to past practice, could not plug the pores in the granular soil or create a filter cake as can bentonite and inorganic colloids. It has been impossible to adequately control fluid loss without adding mineral colloids or finely-divided materials such as native clays and silts incorporated into the slurry from the excavation.

In previous efforts to excavate when using acrylic-polymer-based systems, there has been little correlation or matching of the viscosity or polymer concentration of the fluid to the characteristics or stabilization requirements of the soil or earth formation being excavated, or to the requirements for concrete-to-soil bonding for frictional load transfer. Essentially the same viscosity range and polymer concentration have been used regardless of the nature of the formation being excavated. This indicates a lack of understanding of the properties and performance achievable with the use of polymers.

In the polymer slurries there has been no counterpart of the bentonite filter cake. That is to say, there has been no effective means or medium—equivalent to the bentonite filter cake—of transferring hydrostatic pressure to the surrounding soil, or of controlling the loss of the slurry into permeable soil. The polymer slurries have been used with limited success, providing performance intermediate between simple water and a bentonite slurry. The lack of a pressure differential (or pressure drop) across a relatively thin medium at the excavation/soil interface prevents the efficient transmission of hydrostatic pressure to the walls of the excavation. Instead of this pressure being brought to bear at the wall of the excavation, which results in a supported wall, the pressure is diffused throughout the pore system of the soil near the excavation, resulting in lack of directional support of the soil. High rates of fluid loss result in large volumes of the slurry saturating the soil radially or laterally around the excavation. This saturation of the soil by fluid that is in near-perfect communication with the fluid in the excavation creates a zone around the excavation of essentially equalized pressure.

This equalization of pressure, and the attendant failure of the slurry to exert directional force against the soil, can result in collapse of the excavation. In dry or non-water-saturated granular or permeable soils, the lubricating effect of saturating the soil around the excavation with invaded slurry also contributes to the likelihood of collapse. These problems of excessive permeation by low-viscosity polymer fluid are especially severe when emulsion polymers are used in preparing the fluid, due to the oil and water-wetting surfactants in the emulsions. Deep permeation of a dry sand by polymer fluid containing emulsified oil and water-wetting surfactants can aggravate de-stabilization of the soil by fully wetting the grain-to-grain contact points and lubricating the grains of soil, such that any slight natural cohesion is destroyed and the soil collapses. Thus the absence of a means of transferring hydrostatic pressure, and the related lack of control of fluid loss into the soil, are serious detriments to the slurry excavation process and represent a major weakness in polymer slurry technology as previously practiced.

When using polymer-based systems, control of fluid loss has been achieved by adding bentonite, silts, and/or other available fines or colloids to the fluid or by boring native silts and clays in an attempt to form a mineral-enhanced filter cake on the face of the excavation. When a mineral-based or mineral supplemented slurry is used in fine-grain sands, the dispersed mineral colloids in the slurry can provide improved control of fluid loss because the pores in the soil are small. But mineral-based and mineral supplemented slurries, due to the thick filter cakes they create, reduce borehole or excavation gauge. This reduced gauge can reduce the diameter or thickness of formed or cast structures created in the excavations and boreholes. Similarly, mineral-based and mineral supplemented filter cakes can negatively affect the geometry of the formed or cast structures. Additionally, mineral-based or mineral supplemented filter cakes, as a sheath of continually reactive and hydratable colloids at the interface between the concrete and surrounding earth, can reduce skin friction, or perimeter load shear, on which formed or poured structures rely for their load-bearing capacities. Reduced friction may promote instability, movement and stress on these structures, which can damage the subterranean structure and the superstructure that rests on them.

Historically, polymers were designed and intended to mix without forming masses or pearls of undissolved, incompletely dispersed or semi-hydrated polymer. It has been customary to prehydrate and maximize solubilization, homogenization and colloidal dispersion of these materials before introduction of the fluid into the excavation or borehole. This has been accomplished through the use of induction systems, recirculation, agitation, and processing of the polymer, and retaining the prepared fluid in a maturation tank for a period of time prior to introduction of the fluid into the excavation or borehole.

Clay slurries or muds are formulated with about five to ten percent bentonite in fresh water or about five to ten percent attapulgite in salty water. Whether the slurries are formulated with clays or polymers, the object is to create a viscous and/or dense (high specific weight) fluid that stabilizes and supports the walls of the excavation, excludes groundwater and gases from the excavation, and facilitates the progress of the construction project. A key to success in these efforts is to avoid loss or seepage of the excavating fluid into the surrounding earth during the excavating operation. If the fluid is lost into the earth formation and the excavation cannot be kept full of fluid, the excavation can collapse and groundwater or gases can enter the excavation. Excessive fluid loss can also disrupt naturally occurring cohesive forces between the formation solids.

The viscosity of the polymer-based earth support slurries has been maintained by design generally in a range of about 30 to about 45 seconds per quart as measured with a Marsh Funnel according to viscosity measurement procedures standardized by the American Petroleum Institute. This range of viscosities was felt, in light of "industry knowledge" of the prior art, to be the most effective and least damaging. Builders and engineers have expressed concerns that polymer slurries, especially high-viscosity polymer slurries, might interfere with the bonding of concrete to soil, thus degrading the frictional load-bearing capacity of structures such as bored piles. They have also expressed concerns that higher concentrations of polymer might interfere with concrete-to-rebar bonding and concrete compressive strength development.

These concerns, along with the perceived need to keep the cost of polymer fluids comparable on a unit volume basis with the cost of bentonite slurries, and the lack of appreciation of the fluid loss control and soil-stabilizing performance obtainable with high-viscosity polymer fluids, has caused polymer fluid viscosity and dosage recommendations to be held in low ranges.

The cohesion of granular earth solids exposed in-situ by slurry-excavation or loaded onto or into excavating tools is governed, aside from the inherent cohesion of the soil, by the earth binding capacity of the slurry and maintenance of pore water pressure and intergranular stresses. The earth binding capacity is the composition's affinity for earth solids, which causes the earth support fluid to chemically and physically bond or attach to exposed and excavated earth, both on the excavation tool and on and within the excavation walls. This property also preserves or improves the tendency of grains of earth to hold together in mass as opposed to separating into individual grains or smaller masses (improved cohesion). This improved cohesion aids in loading excavation tools and conveying of the earth solids up from the excavation. When an earth support fluid of high earth binding capacity permeates granular or permeable soil, it can preserve or improve the cohesion of the soil, which helps stabilize the excavation. The earth binding capacity is also manifested as the ability of the earth support fluid to film or encapsulate clay-bearing mineral solids and thereby reduce their tendency to adsorb, absorb or take up water.

When the conventional liquid emulsion PHPA is used as the primary slurry additive, it has occasionally been added directly into the borehole or excavation, and the drilling or excavating tools have been used to mix it with water and/or fluid in the borehole. However, this is not the industry-preferred method for emulsion PHPA addition, because it can produce agglomerates of undispersed, wasted polymer. These agglomerates have been documented to cause voids in concrete due to becoming intermingled with the concrete during placement and then slowly degrading, leaving holes or honeycomb structures within the concrete. Typically and preferably an reduction unit or in-line mixer, sometimes in conjunction with a hydration tank with recirculating pumps is utilized to assure complete solubilization or dispersion of the polymer prior to introduction to the excavation or borehole.

The ability to rapidly mix and yield polymer directly in the borehole or excavation is advantageous because it eliminates the need for costly, cumbersome mixing and processing equipment. It can significantly reduce time required to drill, excavate and construct piers, walls, pads, wells, etc.

Whenever polymer has been used, a primary objective in mixing polymer into water or earth excavation fluid has been to create a homogeneous solution or mixture and to accomplish complete dispersion and dissolution of the polymer as readily as possible. Completely dissolving and homogenizing the polymer in the water or fluid has been considered a key to optimum performance. Incompletely homogenized polymer of any kind, whether in the form of agglomerates, polymer strings, "fisheyes," gels, microgels, pearls or masses has been seen as disadvantageous and wasteful. Avoiding the presence of incompletely hydrated polymer in the slurry has been a prime objective of fluid design and mixing practice.

At the relatively low polymer doses and/or viscosities previously used in acrylic polymer slurries, polymer depletion can occur when silty or clay-bearing soils are excavated. Earth solids disturbed by the excavating tool are mechanically dispersed into the slurry. The increased solids surface area thus exposed creates an increased demand for polymer as the reactive sites on the solid particles attract and bond to the oppositely charged sites on the polymer. This ionic bonding of polymer to dispersed solids depletes the concentration of dissolved or colloidal polymer in the system, such that the properties of the system become governed increasingly by earth solids content and less by the solution properties of the polymer. In a polymer-depleted, solids-laden system Marsh Funnel viscosity values can be maintained in reasonable ranges by the hydration and dispersion of native days, which in a high-concentration polymer system would not be allowed to hydrate and disperse. This solids-based viscosity can give a false sense of security because the viscosity of the system is in expected ranges but there is insufficient polymer available to stabilize the excavation.

The depletion of the polymer in the system allows further hydration of the walls of the excavation, with attendant de-stabilization. At the low remaining concentration of polymer, the polymer acts as a flocculant instead of a viscosifier and stabilizer/protective coating agent. In the flocculated system the flocs of fine solids settle toward the bottom of the excavation and can form a soft mass of non-cohesive material which is difficult to remove with excavating tools. This soft material, if not removed, can create voids in formed concrete and can be detrimental to the integrity and bearing capacity of cast-in-place concrete structures formed in the excavations.

SUMMARY OF THE INVENTION

The invention is a fluid based on vinyl polymer(s), especially those based on acrylic chemistry, composed of water-soluble, water-swellable, hydratable and/or water-dispersible material(s) and a method for using certain water-soluble polymers, polyelectrolytes and buffers to prepare and maintain earth support fluids which are more functionally effective than those known previously. The use of natural polymers is also within the scope of the invention.

The earth support fluids are more functionally effective because they use a higher concentration of polymer, and/or increased ionic affinity, and/or higher viscosities, or because they contain a plurality of: partially-dissolved or hydrated or dispersible masses of synthetic, natural, or modified natural polymers; synthetic and natural resins and latexes; as well as all grafts and blends of the above materials with or without surfactants or hydration inhibitors. The earth support fluids are prepared and maintained without added commercial mineral colloids, and exhibit fluid loss control and preferably one or more of the following properties: borehole or excavation wall stabilization, earth solids encapsulation, improved management and separation of earth solids which have become dispersed into the fluids, improved cohesion of the excavated earth, and improved development of perimeter load transfer at concrete-to-earth interfaces in subterranean structures formed in excavations. It should be understood that for purposes of this application the terms "perimeter load transfer", "perimeter shear", and "skin friction" are used interchangeably.

The earth support fluids of certain embodiments of the invention are formulated and applied in ways which use viscous solutions of polymers in concentrations sufficient to provide a means of creating in granular or permeable soils a zone permeated with gelled or highly viscous, relatively immobile polymer fluid immediately adjacent to and surrounding an excavation. This permeated zone of reduced hydraulic conductivity at the soil/excavation interface—referred to herein as a pressure transfer zone—serves as a medium to efficiently transfer hydrostatic pressure from a column of fluid in the excavation to the walls of the excavation, thus supporting the walls during the excavating process. Limited permeation or invasion of the soil adjacent to the excavation by the viscous fluid creates the pressure transfer zone.

This polymer pressure transfer zone acts in effect as a pressure-reinforced structural support for granular or permeable softs which would tend to disintegrate and cave into the excavation in the absence of an effective soil-support medium. These effects of soil strengthening and the formation of an efficient pressure-transfer medium are achieved by preparing the earth support fluids with sufficient concentration of selected ionically-charged polymers to produce viscous fluids having high effective viscosity, or resistance to flow, at the low shear rates typically encountered at the excavation/soft pore system interface in geoconstruction or well-drilling operations conducted in soft. We have found that the Marsh Funnel viscosity measurement is a good indicator of viscosity requirements for pressure transfer zone formation and creation of an effective pressure transfer medium for providing directional support for the walls of the excavation. As is the case with a bentonite filter cake, the polymer pressure-transfer zone of the invention serves the important function of controlling fluid loss, i.e., loss of the earth support fluid from the excavation into the soft.

Improved cohesion of granular or permeable soils (e.g. sand) when permeated by a polymer-based slurry is primarily governed by a polymer's molecular structure, concentration, ionic character and charge density. The ability of charged sites on the polymer molecules to bond with or adhere to oppositely-charged sites on soil particles allows a polymer to increase bulk soil cohesion through an adhesive effect (bonding soil grains together). This effect is similar to the effect achieved by bonding a mass of sand grains together with a curable epoxy resin which hardens to form a cohesive and durable sand/resin complex, but in the case of the present invention the adhesive effect is temporary in practical application because the adhesive bonding agent is a viscous fluid or gel of polymer, which can be broken down by the alkalinity and calcium content of concrete or portland cement, instead of insoluble hardened epoxy resin.

Cationic polyelectrolytes can also be incorporated into the anionic-based polymer fluid to (a) promote coagulation or removal of suspended soil particles and/or (b) to promote structuring of the fluid. This structuring or interaction between the anionic polymer based fluid and the cationic material imparts a semi-viscoelastic character to the continuous viscous phase. This viscoelastieity makes the fluid more resistant to seepage into the soil. The resistance to fluid migration into the surrounding earth assists the efficient transfer of hydrostatic pressure as described above, supporting the soil.

A preferred embodiment of the present invention displays, due to the combination of molecular weight and anionic charge density and concentration of a polymer of the invention, and/or the viscosity of the prepared fluid, improved earth binding characteristics expressed by improved cohesion of exposed and excavated earth solids, especially sands and gravels. This improvement in earth binding and cohesion facilitates excavation operations, especially auger drilling, and results in greater productivity, improved excavation gauge, and improved preservation of the pre-excavation soil cohesion and pore water pressures in the surrounding earth.

The materials of the present invention which are used as precursors to the formation of hydrated or hydrating masses which form the discontinuous phase of the two-phase fluids, due to one or any combination of their properties (their ionic charge density, molecular weight, chemical composition, cross-linking, surfactant treatments, physical granulometry, particle shape, plasticity, hydration characteristics, solubility characteristics), can provide fluid loss control when used according to the methods defined in this patent.

This method provides for partially-hydrated, semi-solubilized, or functional, insoluble particles (hereinafter referred to as "pearls" or "masses") to be dispersed in the slurry at all times or at specific times of need during the excavation or drilling process. Effective fluid loss control in granular or permeable soils can also be achieved with a fluid of the invention when adequate concentration and/or viscosity of a functionally effective polymer(s), as described above, are employed to prevent or limit the permeation of the soil by the fluid, or to permeate the soil surrounding the excavation with a zone of viscous, earth-binding, continuous or semi-continuous fluid or gel which resists flow or displacement. The polymer typically associates with the water molecules of the fluid, making the fluid mobile yet non-wetting.

The "gel masses" or "pearls" or "composition masses" of this invention are formed in one of three principal ways using the methods of the invention: (1) upon hydration of solid or emulsified particles or micelles of water-dispersible polymer (polymer/water); (2) by interaction of anionic, cationic and/or amphoteric organic polymeric materials such as vinyls, acrylics, polyacrylamides and polyamines (polymer/polymer); (3) by interaction of anionic, cationic and/or amphoteric organic polymeric materials with each other and with soil particles to form polymer/soil complexes or agglomerates (polymer/soil or polymer/polymer/soil). These masses are formed in a variety of sizes and shapes, including but not limited to planar configurations (such as a potato-chip configuration); spheroidal configurations, elongated finger-like or fibrous configurations, and deformable globules, rice hull shapes, straw-like shapes and ovoid shapes.

The dimensions of the hydrating or hydrated masses can range from about 10 microns to about 100 mm with presently available materials, and can be larger if composed of multiple individual masses which have fused together in the process of hydrating or by ionic interaction. Still larger hydrating or hydrated masses may be possible with modifications in the preparation of the dry compositions to produce larger dry particles which are the precursors of the hydrated masses. Relatively large masses can be produced through the addition of a cationic material to an existing anionic fluid, or the interaction among a cationic additive, the anionic polymer fluid, and soil particles. The smallest hydrated masses are produced by dissociation of larger hydrated masses or by direct hydration of finely-divided dry composition particles or by the ionic interaction created in an existing anionic fluid by misting or placing small droplets of a liquid cationic material into the slurry or placing a fine dry cationic material into the existing fluid.

The masses, when present in the fluid, can be partially or fully hydrated. The masses are preferably deformable. This deformability helps the masses conform to, lodge in and constrict or plug pore spaces in granular or permeable formations. This mechanism controls fluid loss, and is especially effective when used in conjunction with a high-dose, high-viscosity continuous or semi-continuous phase formed from dissolved functionally effective polymer(s).

The masses can have a finite life span in the fluid, corresponding to the time required for the masses to completely hydrate and dissolve in the case of compositions which are completely water-soluble. For compositions which are hydratable or water-swellable, the masses may go through phases of hydration followed by dissociation or adsorption to surrounding earth. During the hydrational phase the masses generally become larger; then at some point they can begin to dissociate and may produce many smaller hydrated particles in the fluid. Masses formed via in-situ reaction in an anionic based fluid with a cationic based additive may produce semi-hydrated to fully hydrated masses or globules which are indefinitely stable within the fluid system. These masses or globules are typically deformable and have a high affinity to bond or interact with soil.

The hydrated or partially-hydrated natural and synthetic polymers which form masses that plug the pores in granular or permeable soils, and thereby slow the seepage of the earth support slurry into the surrounding soil, are preferred. Polymers which exhibit earth binding capacity are also preferred. Polymers which allow high formation-to-concrete adhesion, which is expressed as "perimeter load transfer coefficient", or "perimeter load shear" are also preferred.

The ability of the polymeric and resinous materials to form both transient or degradable pearls or masses or form more persistent pearls or masses for controlling fluid loss, or for optimally plugging porosity in permeable formations is achieved in the manufacturing or processing of the material or during preparation of the fluid in the field by one or more of the following techniques: (a) partially crosslinking the material to retard hydration, reduce solubility, and increase branching; (b) highly crosslinking the material to retard hydration and reduce solubility; (c) surface treatment (including in-situ co-addition) of the materials, as with a surfactant, a coating, microencapsulation, or physical processing, to retard hydration; (d) blending the materials with co-additives (e.g. electrolytes, cations, etc.) which retard hydration; (e) granulation or flaking or agglomeration and sorting to optimize particle size of the dry materials, which impacts rate of hydration for hydratable materials and the size of semi-hydrated particles in the slurry; granulation and size sorting also impact pore-plugging performance of insoluble or plastic particulates; (f) copolymerizable surfactants being incorporated in the polymers backbone which impact hydrophilic tendencies; (g) polymerization to yield an amphoteric or ampholytic structure; (h) grafting materials together to form an optimized end material; (i) the incorporation of a hydrophobic or semi-hydrophobic, or non-water soluble material to retard water solubilization; (j) blending the materials in-situ with cationic co-additives (e.g. polyacrylamides, mannichs, polyDADMACs polyamines, polyMAPTACs, polyethylene imines, etc.) which interact with the anionic based slurry to form a variety of mass configurations; (i) blending the materials in-situ with cationic co-additives (e.g. polyacrylamides, mannichs, polyDADMACs, polyamines, polyMAPTACs, polyethylene imines etc.) which interact with the anionic based slurry to structure the fluid.

Within the scope of this invention are synthetic, natural and modified natural polymers, including blends and grafts, which are prepared and used in ways which create a fluid comprising a continuous liquid phase in which is present a plurality of hydrating or hydrated polymer masses. Examples of such materials are synthetic polymers and natural polymers such as polysaccharides, gums, biopolymers and combinations thereof. Also within the scope of this invention are fluids composed of water-soluble or water-dispersible synthetic polymers which exhibit one or more of the characteristics or performance attributes of the invention described herein, when a plurality of hydrating or hydrated polymer masses is not present. The polymer masses are helpful in obtaining the desired performance in granular or permeable soils, but adequate performance can often be obtained without the masses if the polymer selection, dosage, and fluid viscosity are in accord with the method of the invention as described herein.

In a preferred embodiment of this invention a vinyl copolymer forms both the continuous fluid phase and the discontinuous phase of hydrating or hydrated masses dispersed in the fluid. In an alternate embodiment, hydrating or hydrated masses of natural polymers or modified polysaccharides are suspended in a continuous fluid phase of solubilized anionic or amphoteric polymer. In an alternate embodiment, cationic materials are added to a continuous or semi-continuous fluid phase coning solubilized anionic or amphoteric polymer to form masses or to increase the viscosity or structure of the excavation fluid. When cationic materials are introduced into an anionic or amphoteric based polymer system they can create an effect through bonding of cationic sites with anionic sites that increases the viscosity of the fluid and can increase the capacity of the fluid to hold particles in suspension. This increased structure can also decrease migration or permeation of the fluid into the surrounding earth.

The polymers of the present invention, when the creation of a plurality of hydrating or hydrated polymer masses is desired, are preferably added in a solid granular, flaked, or agglomerated state with the dry particles ranging in size from 0.01 mm to 50 mm (in certain flaked products), and currently in a range of 0.01 mm to 10.0 mm, and with the majority by weight of the particles being between 0.10 mm and 2.5 mm for most available products. All of these materials become larger when initial hydration occurs, although dissociation may eventually reduce the hydrated particle size.

The fluids of the present invention, when the creation of a plurality of polymer masses is desired, can also be achieved through the addition of liquid polymers via methods designed to create discrete ionically reactive nuclei in the fluid. Liquid polymers in both solution and emulsion form of either cationic, anionic, or amphoteric charge character can be added via misting, controlled droplets, or specialized mixing equipment to produce the desired masses described hereinabove.

The fluids of the present invention have API Marsh Funnel viscosities as follows:

(a) Dual-phase fluids with masses formed by any means, for use in any type of soil or earth formation: about 28 seconds per quart or greater; more preferably about 32 seconds per quart or greater; and most preferably about 36 seconds per quart or greater.

(b) Single-phase anionic acrylic fluids for use in shale, clay, silt or other fine-grained soils or earth formations not classified as sand or coarser: greater than about 45 seconds per quart; more preferably greater than about 50 seconds per quart; and most preferably greater than about 55 seconds per quart.

(c) Single-phase anionic acrylic fluids for use in dry sand, gravel or other non-cohesive soils or earth formations: greater than about 60 seconds per quart; more preferably greater than about 70 seconds per quart; and most preferably greater than about 75 seconds per quart.

(d) Single-phase anionic acrylic fluids for use in wet sand, gravel or other non-cohesive soils or earth formations: greater than about 45 seconds per quart; more preferably greater than about 55 seconds per quart; and most preferably greater than about 60 seconds per quart.

(e) Single-phase fluids comprising a combination of any two or more materials of anionic, nonionic, amphoteric, associative and/or cationic nature, for use in any type soil or earth formation; greater than about 28 seconds per quart; more preferably greater than about 32 seconds per quart; and most preferably greater than about 36 seconds per quart. These fluids may be structured, possess an enhanced inter-associated or ionically bonded polymeric network, or they may be unstructured.

(f) Single-phase fluids comprising an associative polymer, for use in any type soil or earth formation; greater than about 28 seconds per quart; more preferably greater than about 32 seconds per quart; and most preferably greater than about 36 seconds per quart.

(g) Single-phase fluids comprising an amphoteric polymer, for use in any type soil or earth formation; greater than about 28 seconds per quart; more preferably greater than about 32 seconds per quart; and most preferably greater than about 36 seconds per quart.

(h) Single-phase fluids comprising a cationic polymer, for use in any type soil or earth formation; greater than about 28 seconds per quart; more preferably greater than about 32 seconds per quart; and most preferably greater than about 36 seconds per quart.

When the fluids are based on anionic polyacrylamides, and the viscosities are higher than about 40 seconds per quart, the dosage of the primary polymer (active basis) is preferably greater than about 0.7 grams per liter.

Increased viscosity is a key feature of certain embodiments of the present invention. Viscosity, polymer selection and polymer dosage are specified in relation to reactivity, hydrational potential, granularity, porosity, permeability and hydraulic conductivity of the earth formation. The resultant fluids should allow settling of disturbed earth solids larger than about 75 microns, or should suspend disturbed earth solids indefinitely until the fluid has been removed from the excavation or until solids-separation processes are effected. The fluids should also allow dispersion of additional fresh polymer or incorporation of other additives.

Polymeric earth support fluids based on anionic vinyls and other anionic polymer bases or carboxyl-containing polymers (e.g. polyacrylate, carboxymethylcellulose) are generally sensitive to contamination from divalent and polyvalent cationic contaminants such as earth metals (calcium, magnesium, iron, zinc, etc.), and to a lesser extent monovalent cations such as sodium and potassium. The sensitivity of such polymeric earth support fluids to such contaminants has certain benefits (e.g. allowing improved bonding between concrete and soil) and certain detriments (e.g. excessive concrete-induced degradation of fluid, causing increased consumption of polymer).

It has been known and practiced in the prior art to mitigate contamination from such sources by pre-treating the fluid with certain buffers such as sodium carbonate, sodium bicarbonate, and various phosphates. In clay-based drilling muds and slurries these buffers have also been used, usually in conjunction with organic thinners, as treatments to precipitate contaminants such as calcium to allow deflocculation of the clay-based systems and to restore their properties. The novelty in our use of buffers, sequestrants and hydroxides lies in the discovery that they can be used, alone or in combination, to offset the effects of cation contamination in polymer systems via novel processes of cation replacement and polymer hydrolysis.

In fluids of the invention comprising anionic polymers, soluble hydroxides present in high relative concentrations as hydroxyl ions can restore fluid viscosity and polymer functionality via a mechanism of "pulling" the contaminating cations off the passivated anionic sites on the polymer chain, which allows rehydration and uncoiling of the collapsed polymer. Excess hydroxyl ion, at pH levels above about 11.5, can also restore system viscosity and anionic functionality by hydrolyzing amide groups to carboxyl groups. This can be accomplished by treating the fluid first with a hydroxide (to initiate hydrolysis), followed by buffering with a weak acid, a phosphate, a phosphate ester, a phosphonate, or soluble bicarbonate to reduce pH and arrest hydrolysis after some amount of new carboxyl groups have been formed. Hydrolysis of amide to acrylate creates new functional groups which restore viscosity and functionality to the system. In the prior art it was believed that the high-pH and high-soluble-calcium environment created by concrete or cement contamination caused irreversible precipitation of carboxyl-containing polymers.

In another novel and beneficial use of soluble hydroxides, the precipitates they form with such contaminating cations as magnesium are used alone or when complexed with polymers as sealing or plugging agents to control fluid loss in granular, permeable or fissured formations.

BRIEF DESCRIPTION OF THE DRAWINGS

FIG. 2 is a chart showing a comparison of viscosity development efficiency using a composition and method of this invention.

FIG. 3 also shows the effects of hydration time on fluid loss control of a composition and method of this invention and on a prior art polymer composition and method, both compared to bentonite.

FIG. 4 is a chart showing filtration control performance versus time at equal hydration times (30 minutes) for a preferred embodiment of this invention and for a composition of the prior art.

DETAILED DESCRIPTION OF THE PREFERRED EMBODIMENTS

Figure 1:
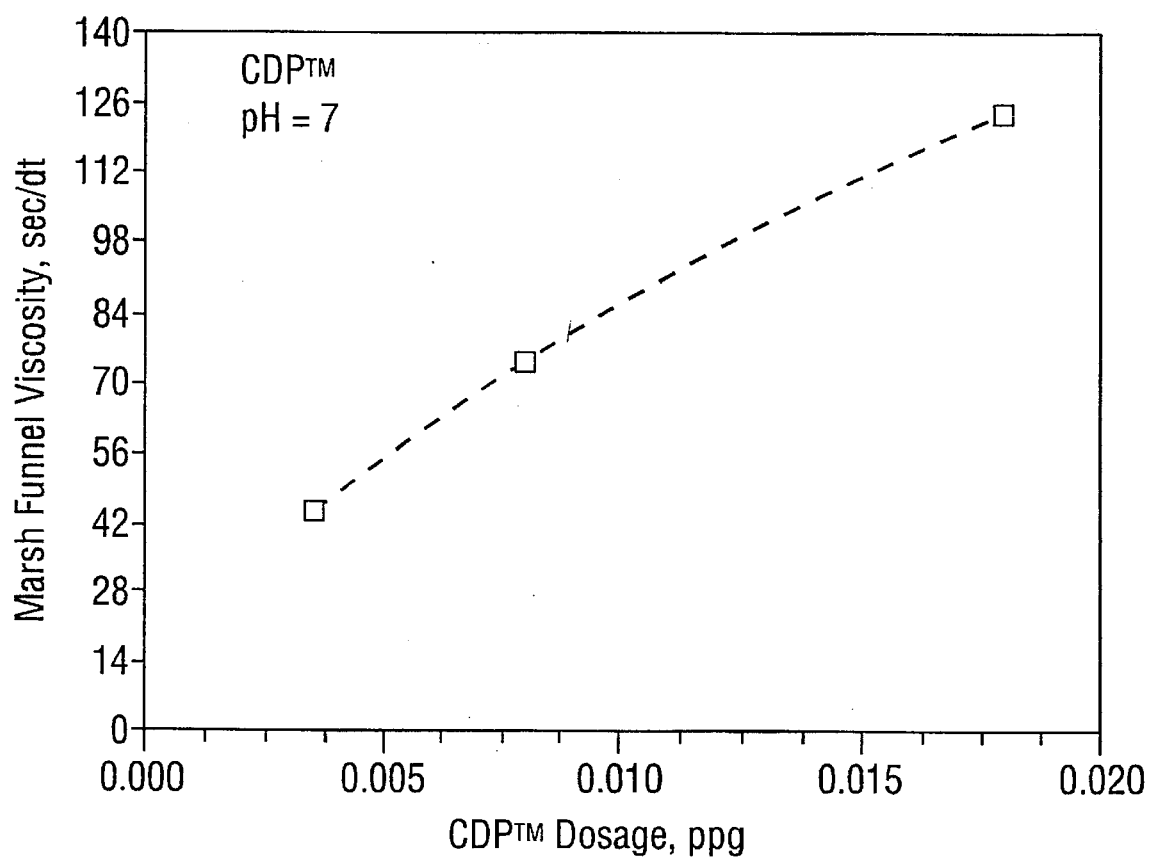
FIG. 1 is a graphic representation of the Marsh Funnel viscosity versus the CDP dosage. The term "CDP" shall be understood to refer to the trade name for a polymer based product within the scope of this invention marketed by KB Technologies Ltd.

In a preferred embodiment an earth support fluid is formulated as an aqueous slurry having suspended therein a plurality of masses of partially-hydrated, or hydrating, water-soluble, water-swellable, hydratable and/or water-dispersible compositions (the "composition masses"). The earth support fluids contain suspended therein partially-dissolved and/or hydrated and/or dispersible synthetic or natural polymers, resins and/or latexes; and all grafts of the above compositions. The molecular weight of the composition(s) may vary over a wide range, e.g., 10,000–40,000,000 or higher. The invention, however, finds its greatest usefulness when anionic acrylic polymers having molecular weights of 100,000 or more, preferably one million or more, and most preferably in excess of 10,000,000 are applied to form the continuous phase as well as all or a portion of the discontinuous phase, which is the plurality of hydrating or hydrated polymer masses. Cationic polymers may also be added to the continuous anionic polymer phase to enhance the structuring characteristics of the fluid, or to produce or supplement a discontinuous phase.

In a second preferred embodiment, the fluid can be prepared or used without the composition masses, but with a sufficient concentration of a selected functionally effective polymer to provide adequate viscosity and/or earth binding capacity to provide one or more of the following functions: add cohesion to granular or permeable soils by acting as a permeating adhesive; limit or control loss of the fluid into granular or permeable soils and support the walls of the excavation via hydrostatic pressure transfer by impregnating the pore system of the soil with viscous polymer fluid which resists displacement, or by using a fluid so viscous that it cannot freely permeate the soil; improve, through cohesion enhancement and adhesive effects, the loading and conveyance of excavated soil spoils on and in tools such as augers and grabs; allow improved bonding of concrete to soil, and improved frictional load transfer as compared with existing slurry technologies.

The anionicity of the polymer may be obtained from the hydrolysis of acrylamide during the polymerization or from the copolymerization of acrylamide with the anionic monomers comprising acrylic acid, methacrylic acid, maleic acid, maleic anhydride, fumaric acid, itaconic acid, vinyl or, styrene sulfonic acid, 2-acrylamido-2-methylpropane sulfonic acid (AMPS®) and the like, and water soluble salts thereof. The preferred anionic monomers are acrylic acid, methacrylic acid, maleic acid, vinyl or styrene sulfonates and AMPS® or their salts. Copolymers comprising acrylamide and/or other non-ionic monomer, with more than one anionic monomer foregoing is also within the scope of the invention.

The molar percentage of the comonomers in the polymer may vary within certain limits, provided that the total adds up to 100%. The anionic charge density will vary from about 5% to 90%, preferably 10% to 80%, and most preferably 35% to 65% in the polymer. The composition, anionicity, and molecular weight of the copolymer may be optimized for the particular earth formation and water conditions in order to achieve the desired drilling, boring, or excavation and earth supporting functions.

The anionic copolymer of the invention may be further modified by incorporating certain cationic monomers in the polymer forming ampholytic polymers. The cationic monomers are selected from the group consisting of: diallyldimethylammonium chloride, quaternized dimethylaminoethyl (meth)acrylates, and N,N-dimethylaminopropyl methacrylamide and combinations thereof. These cationic constituents may be reacted to form acid salts or quaternized using methyl chloride or dimethyl sulfate.

Non-ionic monomers for use in the practice of the present invention are selected from the group consisting:

acrylamide, methacrylamide, $C_1$ to $C_{20}$ acrylates, N-vinyl pyrrolidone, vinyl acetate, styrene, N-vinyl formamide, N-vinyl acetamide or mixtures of the forgoing. Especially preferred is acrylamide.

A small amount of water insoluble/hydrophobic monomers such as $C_5$ to $C_{20}$ long chain alkylates, hydroxyalkylates, and N-alkyl substituted acrylamides may also be incorporated in the copolymer of the invention. These hydrophobic groups tend to associate with one another in an aqueous solution to form an inter/intra molecular association. As a result, the solution viscosity is increased and the viscosity is relatively insensitive to salts as compared to polymers without the hydrophobic groups.

Polymerization of the monomers may be conducted in the presence of a crosslinking agent to form the crosslinked or branched composition. The crosslinking agent comprises molecules having either a double bond and a reactive group, two reactive groups or two double bonds. The agent may be selected from a group comprising N,N-methylenebisacrylamide, N,N-methylenebismethacrylamide, polyethyleneglycol di(meth)acrylate, glycidyl acrylate, acrolein, N-methylolacrylamide, alkylaldehydes $C_1$–$C_{42}$, glyoxal, diallylamine, triallylammoninm salts, ammonia, $C_1$ to $C_{25}$ amines (including diamine or triamine), epichlorohydrin, diepoxy compounds or the like and mixtures of the foregoing. The crosslinking or branching is due to the inter or intra molecular reactions of the monomeric units in the polymer chain with the crosslinking agent. The agent is to be used in sufficient quantifies to assure a crosslinked or branched composition so long as the resulting polymer is still water soluble or hydratable. Preferably, 0.001% to 20%, and more preferably 0.01% to 10% based on the total monomer weight, is used for the purpose. The proportion of these materials in this application can range from 0.01 to 300 kilograms per cubic meter by dry weight of polymer on volume of water or slurry.

The rheological profile of the polymer fluid is significantly impacted by the anionicity and the degree and type of crosslinking, and the amount and type of cationic, associative or amphoteric material added. FIG. 2 is a chart showing a comparison of viscosity development efficiency using a composition and method of this invention.

The composition pearls or masses can exhibit a finite and controllable life span in the excavation fluid. This life span can range from several minutes to several weeks based on the composition chemistry, physical and chemical properties of the excavation fluid. The composition masses' life span can be controlled by any one or a combination of the following chemical mechanisms: (1) degree of crosslinking and/or branching; (2) method of crosslinking and/or branching; (3) solubility, and/or hydrophilic/hydrophobic nature of the compositions; and (4) inclusion of coadditives and/or surface treatments to the compositions.

The composition masses' life span may be influenced in-situ either positively or negatively by continued exposure to shear stress, exposure to cations or electrolytes, exposure to earth solids, or continued hydration over time. A composition pearl or mass can be defined as a discrete constituent, or element, existing independently within an excavation fluid, and possessing the characteristics given above in the Summary of Invention. These pearls or masses impart unique performance characteristics to the fluid allowing for the reduction of fluid loss to the excavated formation. The composition pearls' or masses' ability to decrease formation porosity at the formation interface is achieved through the pearls or masses being drawn into the formation voids and completely or partially plugging and sealing these voids.

As these composition pearls or masses build on one another they constrict or plug pore throats to reduce fluid loss. A filter cake or in-depth soil matrix seal of synthetic or natural polymer and/or resin is formed. This filter cake or seal may incorporate colloidal or dissolved water soluble polymer or resin to further improve filtration control and filter cake construction. When the fluid is formulated or used with the gel masses present, the optimization of these pearls or masses is a significant determinant of the performance and soil-sealing properties of the fluid and the filter cake or matrix seal. These composition pearls or masses of synthetic or natural polymer or resin or combinations thereof allow for the elimination of bentonite, silt, and/or other colloidal or finely divided material from the fluid design when used in one method of this invention.

The interaction between the pearls or masses, the polymer, and the earth forms a filter cake on and within the excavation walls and, to a greater degree in coarse-grained soils, a polymer/soil viscous conglomerate or structure comprising the in-situ soil grains and the polymer/gel fluid which permeates the pore matrix of the soil under hydrostatic pressure. The polymer filter cake and the in-depth polymer/soft structure significantly assist in maintaining a stable side wall in the soil formation. Side wall stabilization is enhanced by reduction in fluid loss to the formation, maintenance of hydrostatic pressure differential transferred through the wall cake and in-depth matrix seal, and increased earth binding capacity of the fluid.

The polymer filter cake, or polymer/soft matrix, produced by this invention significantly reduces the fluid loss to the surrounding formation. Excessive fluid loss to the soil formation, especially when the lost fluid is water or low-dosage polymer/water fluid, hydrates the formation and disrupts the natural cohesive forces between formation solids. This loss of cohesive forces causes side wall sloughing and cave-ins. The polymer/soil matrix maintains a significantly more stable excavation than that known in the prior art by reducing or inhibiting the hydration of the formation and/or changes in soil pore pressure and maintaining a hydrostatic pressure differential through or across the polymer/soil matrix.

Figure 3:
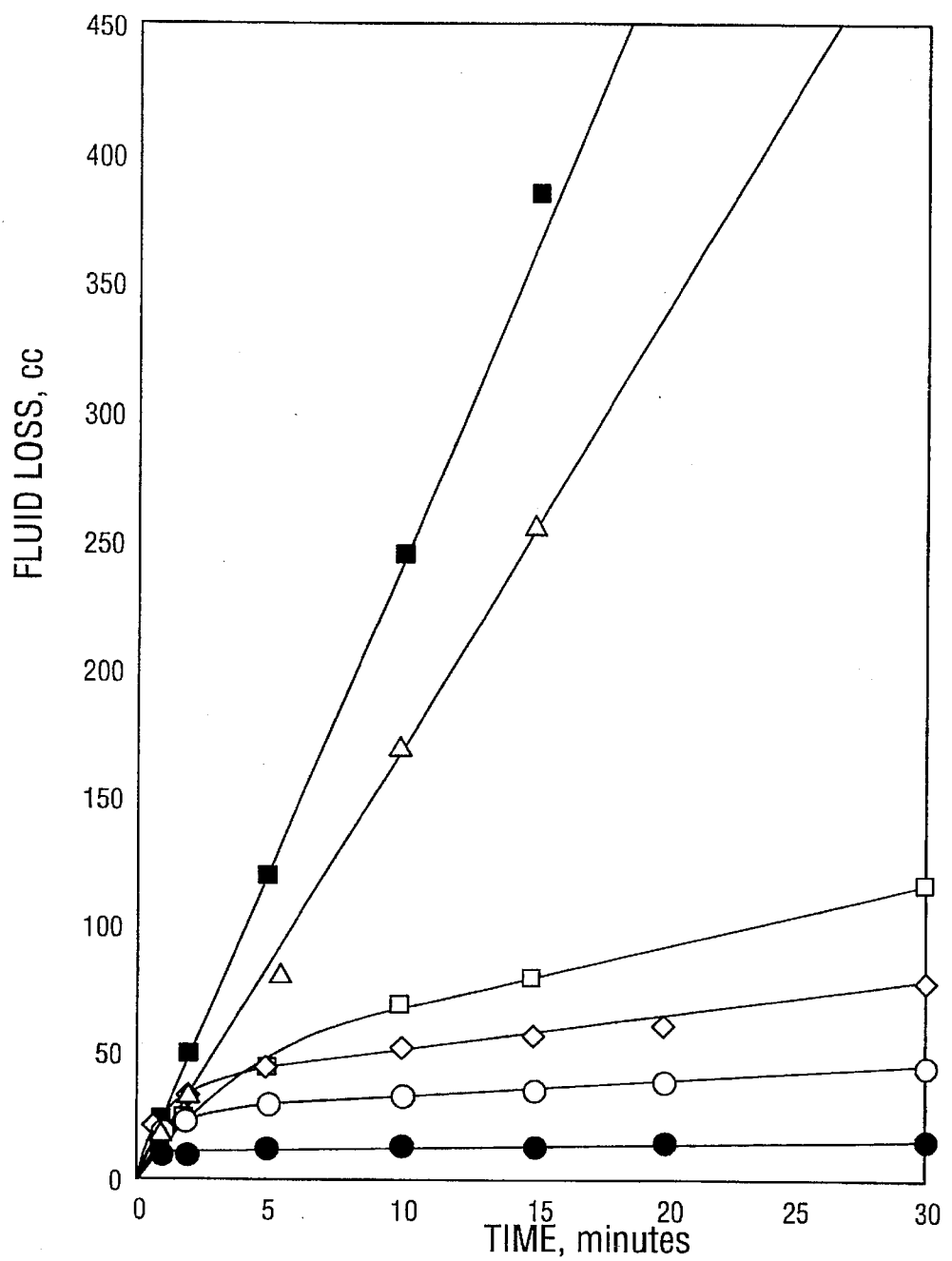
FIG. 3 is a graphic representation of the fluid loss control characteristics of the composition and method of this invention in comparison to prior art compositions and methods.

FIG. 3 shows the fluid loss control versus polymer hydration time of a preferred embodiment of this invention and two other commercially available construction drilling slurry products. Hydration times shown in FIG. 3 are time elapsed between introduction of polymer into mix water and initiation of filtration test. Hydration time is a principal determinant of the presence, abundance and quality of the partially-hydrated or hydrating gel masses in the fluid. Generally, as hydration time is increased, the number of discrete gel masses is reduced and the gel masses which are present become larger and more elastic. Thus the pore-plugging effect of the gel masses is reduced and the fluid must rely on continuous-phase viscosity and polymer-to-soil-grain bonding (adhesion) to control fluid loss, increase soil cohesion and effect the other functions of the invention. In developing data for FIG. 3, commercially available products were mixed at low shear with a single corrugated disk impeller at approximately 3,000 RPM. The products were stirred for 5 to 10 minutes and were unstirred during the remainder of the hydration time. Bentonite was mixed at a high shear to assure good dispersion. The test was conducted at a 5 psi pressure differential against a manufactured, artificial sand stone disk, ¼" thick having a permeability of 20 darcies and a pore diameter of 60 microns nominal.

FIG. 4 is a chart comparing filtration control performance of a preferred embodiment of this invention to filtration control of a prior-art polymer fluid, when both polymers have equal times of hydration.

In a preferred embodiment of this invention, the polymer materials are introduced into the fluid by direct addition into the mouth of the borehole or excavation and the excavating or drilling tools are used to mix the fluid in-situ without benefit of other specialized mixing or pre-mixing equipment or procedure.

In an alternate preferred embodiment of this invention, the materials used to create the earth support slurry are introduced indirectly into the mouth of the borehole or excavation, without the excavating or drilling tools being exclusively used to mix the fluid in-situ. Material would be added to the system with the benefit of other specialized mixing, pre-mixing equipment, hoppers, or other indirect procedures.

The charge density characteristics of the polymers of the invention are a primary factor in the earth binding capacity of the fluid. Earth binding capacity is a polymer's or material's ability and capacity to bond to and stabilize exposed or excavated earth. This affinity functions to improve side wall stabilization, borehole gauge and removal of excavated earth. Charge density, or the ratio of anionically and/or cationically charged pendant units on the polymer, is a primary contributor to the degree of earth binding capacity a polymer possesses.

In one preferred embodiment of this invention, the excavation carrying capacity, or the ability of the excavation tools or systems to hold and remove increased loadings of earth, is significantly improved due to the earth binding capacity of the slurry. The improved earth binding capacity allows removal of excavated solids, or earth, with excavation tools not previously successful when prior art materials have been used. Improved excavation carrying capacity increases the efficiency of the excavation operations.

In a preferred embodiment of this invention, the polymer is a water-soluble or partially water-soluble or hydratable or water-dispersible linear, branched, crosslinked, partially-crosslinked, or grafted material, which is further treated with hydrophobic surfactant to retard hydration or through blending the materials. Hydrophobic surfactants can be added by in-situ co-addition, coating, micro encapsulation, or physical processing.

When the polymer of the subject invention is non-crosslinked and water-soluble, partially water-soluble, hydratable or water-dispersible, the granulometry, hydrophilicity/hydrophobicity, molecular weight, rate of dissolution, and other factors are combined with an application technique which exploits the transitory hydrational phase (the period of time during which the polymer is suspended in the fluid as discrete partially-dissolved or dissolving masses or pearls) to accomplish control of fluid loss.

Hydrophobic surfactants can be incorporated into the polymer during manufacture and as an interstitial component dried within the polymer granule or as a post-manufacture surface treatment to retard hydration and prolong the duration of pearls or masses with and without crosslinking. The hydrophobic surfactants comprise surface active agents having HLB (hydrophilic/lipophilic balance) values in the range of about 2 to about 10, preferably less than 8. Suitable surfactants include sorbitan esters, phthalic esters, fatty acids, glycerides, glycerines esters, as well as amides and ethoxylated or propoxylated versions of the above. A preferred embodiment of this invention incorporates slightly to moderately crosslinked polymers with slight surfactant treatment.

In one preferred embodiment of this invention, the pearls or masses are transitory. The transitory nature of the pearls or masses is controlled by the type and amount of crosslinking of the polymers. The polymer crosslink ruptures over time and the pearls and masses degrade. Hydration, shear and ionization degrade the total polymer and disrupt the mass structure. The soluble polymers, pearls, and masses, collapse or degradation can be accelerated by contact with divalent and trivalent cations, oxidizers and/or chlorides. This collapse or degradation of the pearls and masses is critical for construction and other industries where concrete, grout, cement, or other materials are placed in a column, wall, or trench. In these applications side wall friction, or side wall load bearing capabilities are important. This invention provides for significantly reduced residual interference with side wall characteristics, thereby producing improved structural integrity and load bearing capacity.

Figure 5:
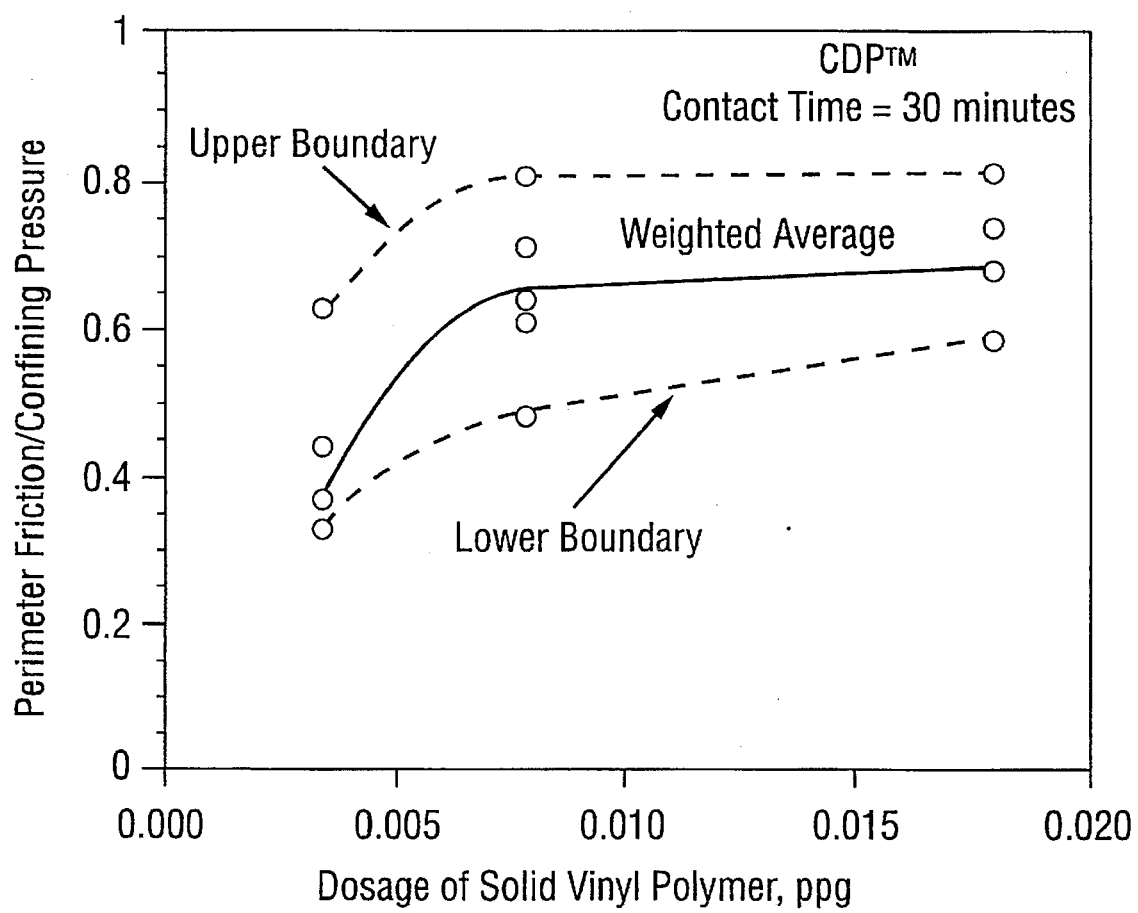
FIG. 5 is a graphic representation of peak values of perimeter friction/cell pressure from extraction testing for fine sand specimens drilled under CDP slurries.

The degradation of the solubilized polymer, pearls and masses within the fluid as well as at the side wall interface significantly improves the side wall friction coefficients over prior art drilling and excavation fluid technologies. FIG. 5 shows a graphical representation of perimeter friction/cell pressure from extraction testing for fine sand specimens drilled utilizing prior art technology and a preferred embodiment polymer. Slurry degradation also improves displacement by concrete, cement, grout, etc. yielding improved quality of the final structure or plug due to decreased contaminant intrusions, voids within, and/or direct contamination of the concrete, cement, grout, etc. of the final structure.

In one preferred embodiment, the hydrated or partially-hydrated natural and synthetic polymers form masses that plug the pores in granular or permeable soils, and thereby slow the seepage of the earth support slurry into the surrounding soil are used. Polymers which exhibit earth binding capacity are preferred. Polymers which allows high formation-to-concrete adhesion, which is expressed as "perimeter load transfer coefficient", are also preferred. See FIGS. 6 and 8.

Figure 8:
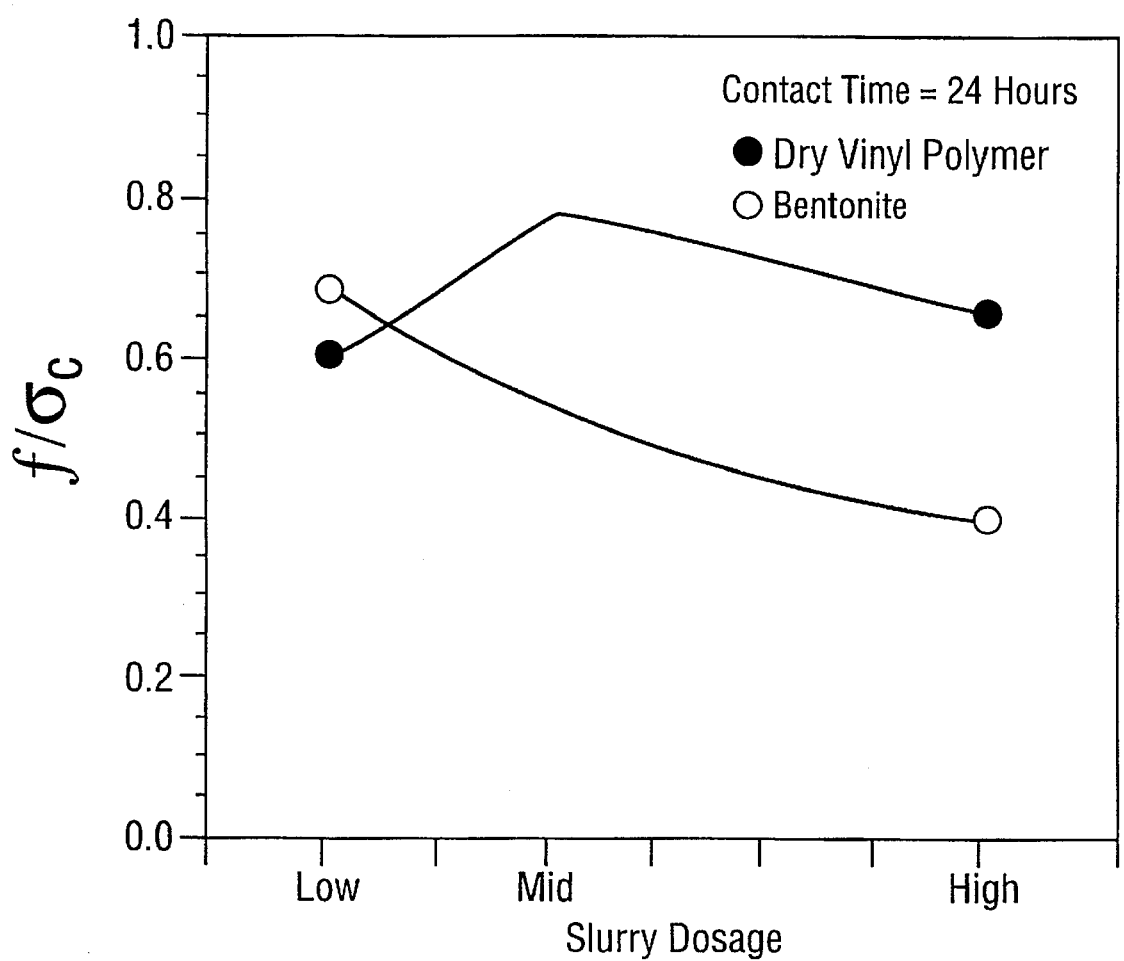
FIG. 8 is a graphic representation of a comparison of mean normalized perimeter shear for 24 hours contact time.
Figure 9B:
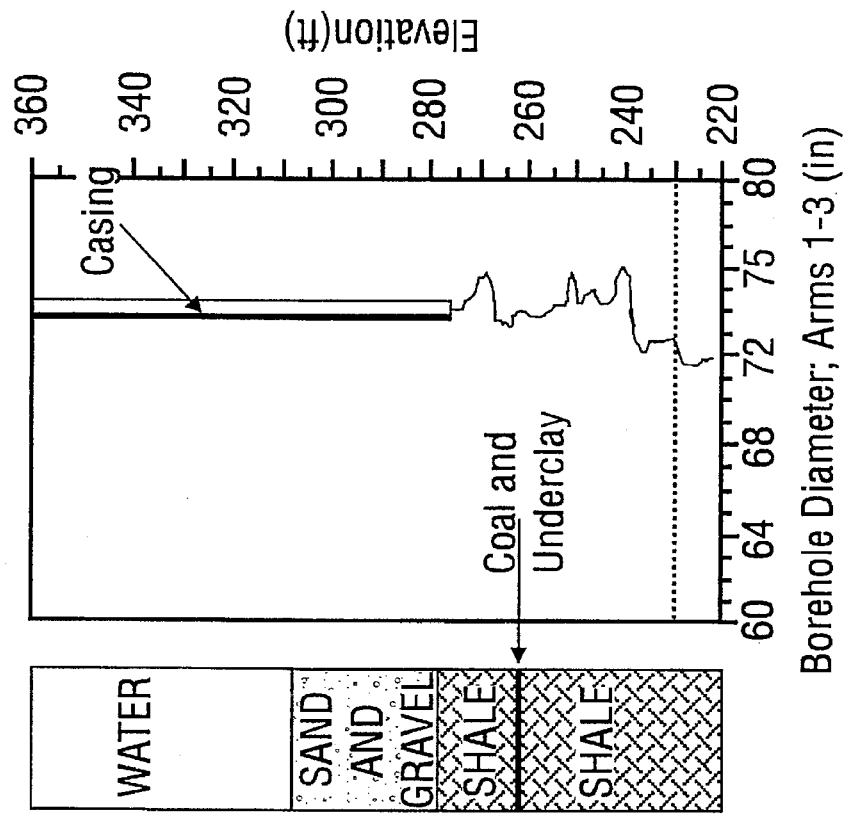
FIGS. 9a and 9b and 10a and 10b are graphic representations of borehole profiles for pile holes bored using the earth stabilization fluids of this invention.
Figure 9A:
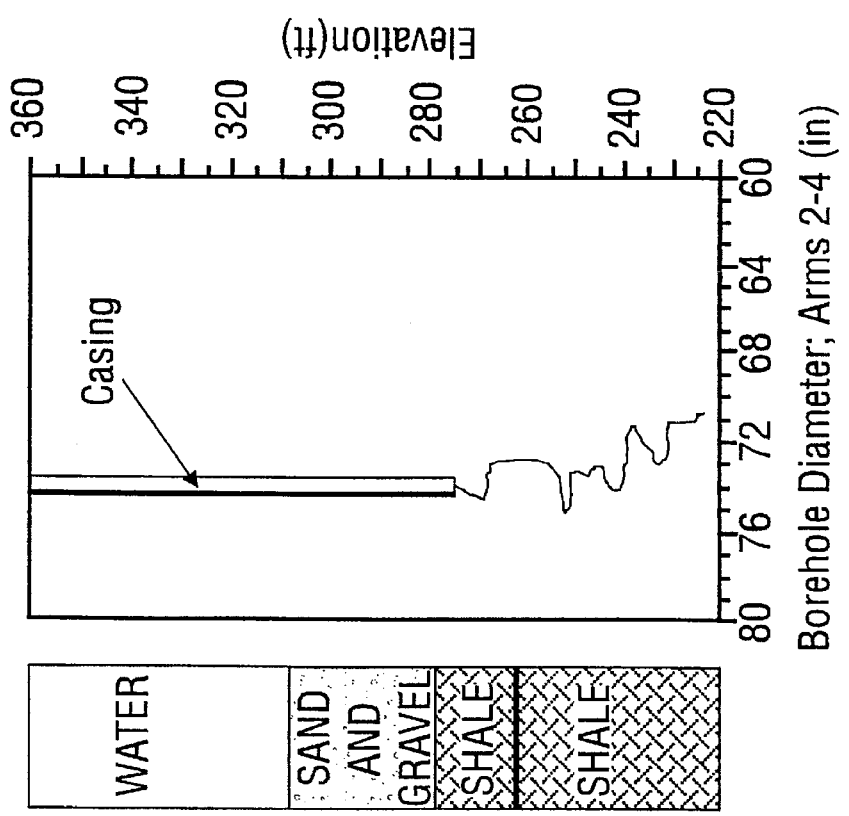
Figure 10B:
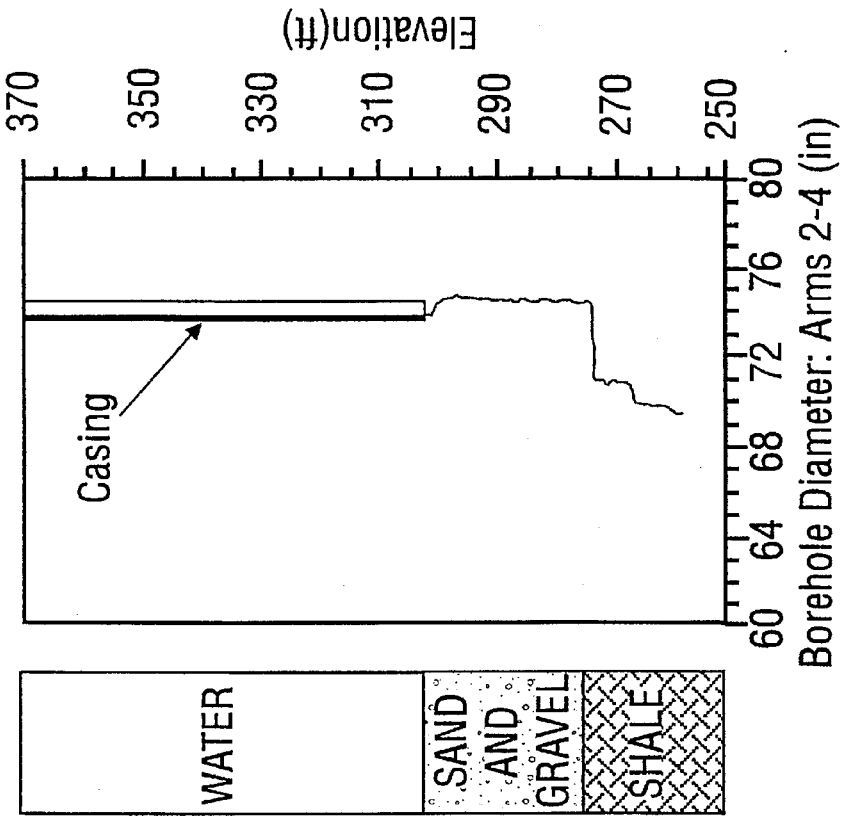
Figure 10A:
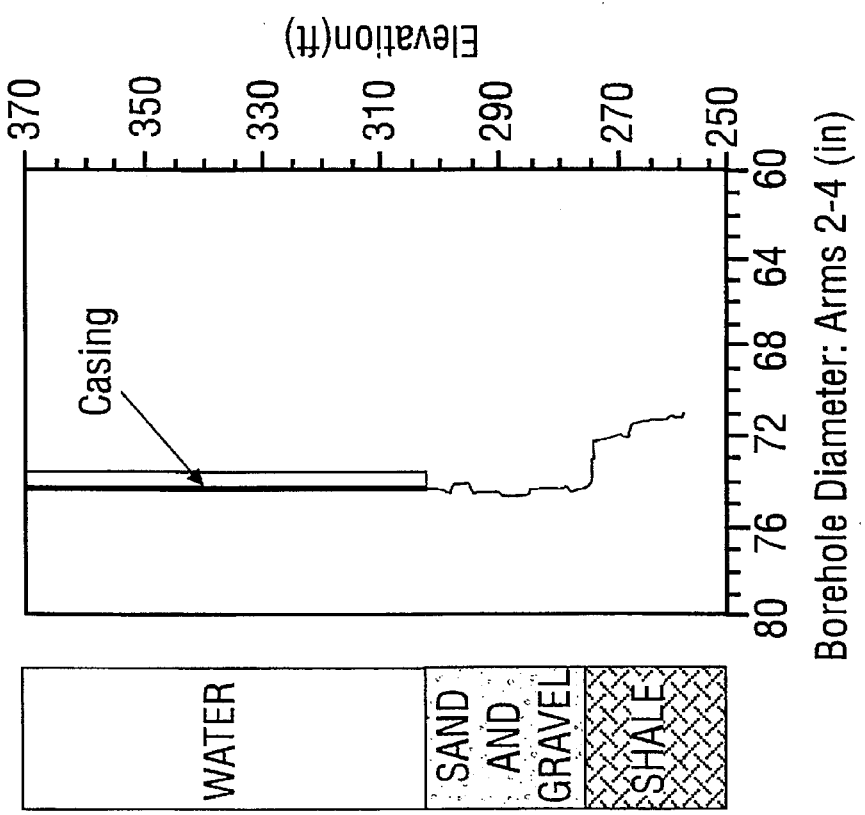
Figure 11:
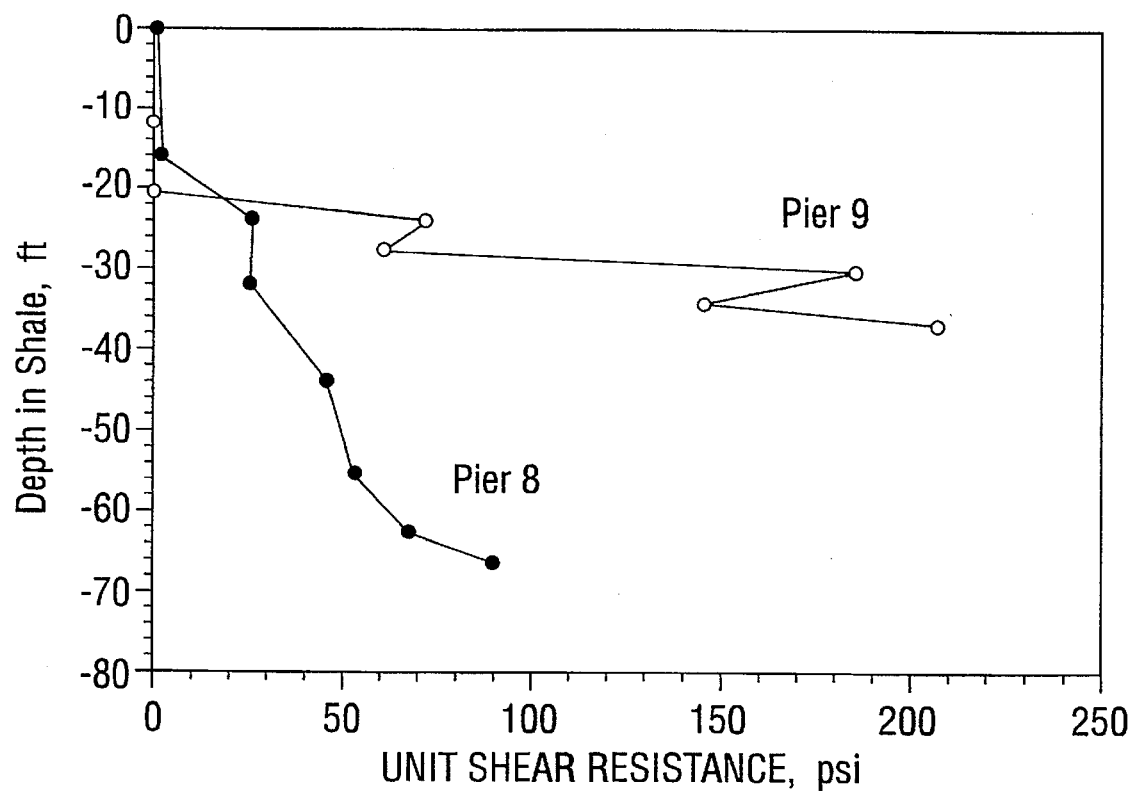
FIG. 11 is a graphic representation of load test results measured as a function of depth versus unit shear resistance for concrete piles cast in holes bored using the earth stabilization fluids of this invention.
Figure 12:
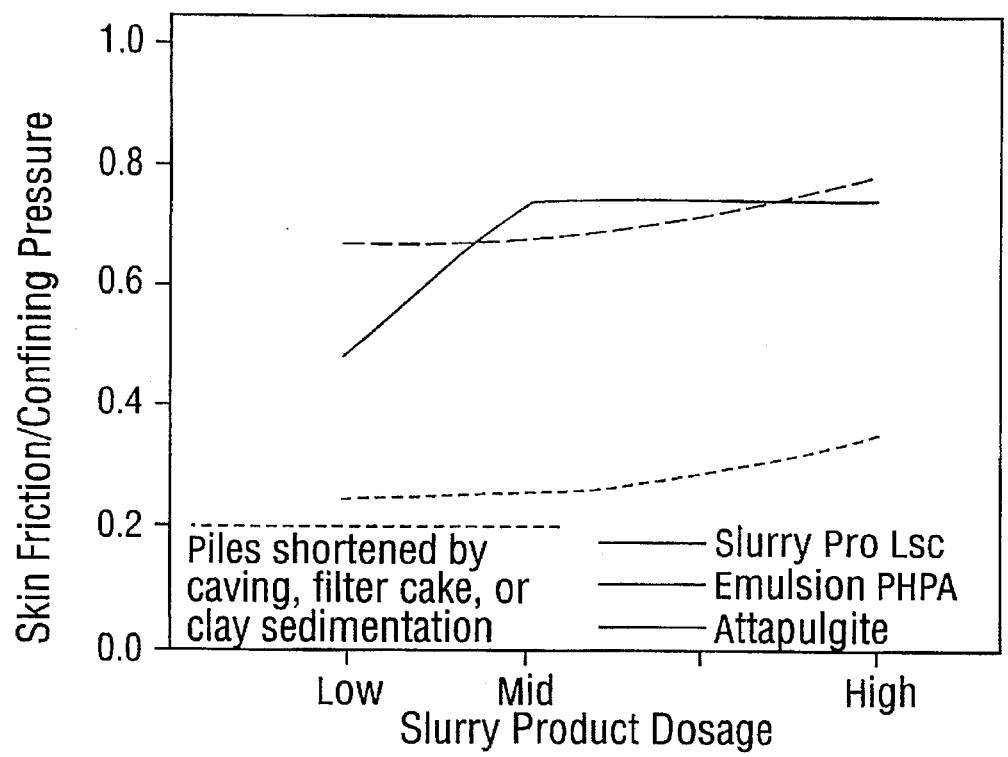
FIGS. 12, 13, and 14 are graphic representations of the "skin friction development" and filtration control effects for bored piles constructed using the earth stabilization fluids of this invention.
Figure 13:
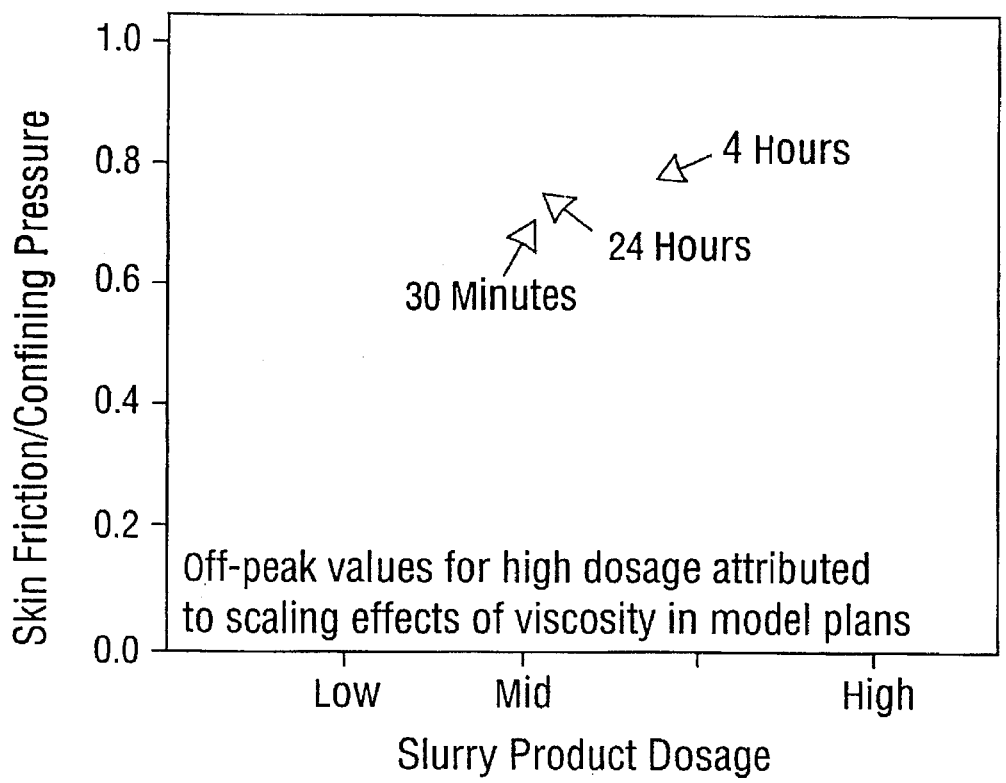
Figure 14:
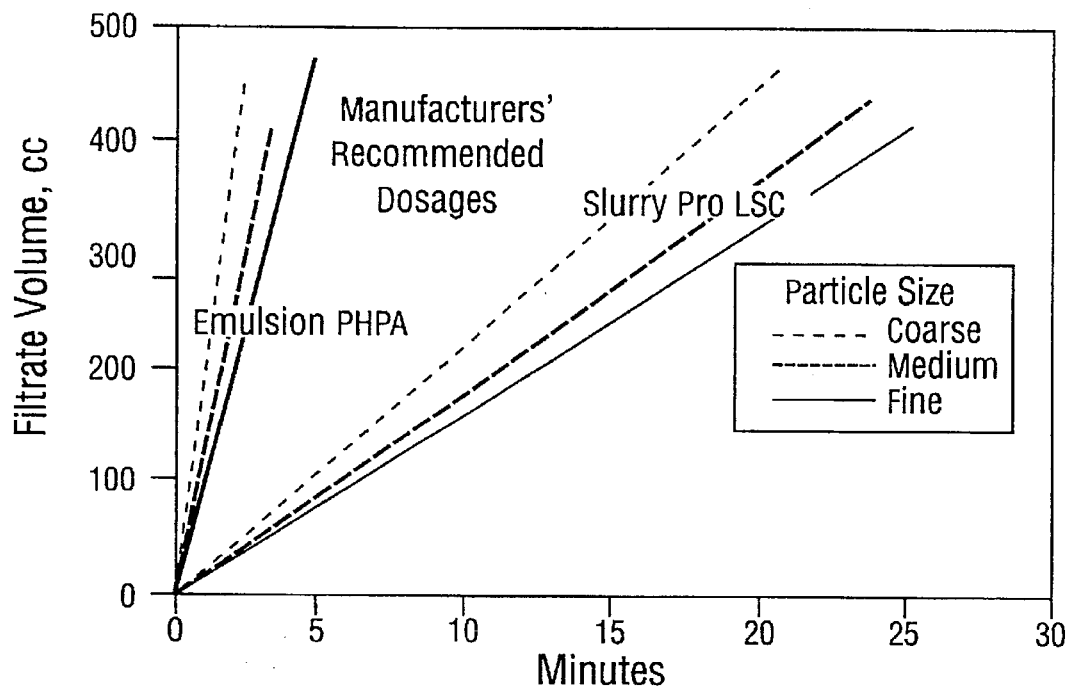
Figure 15:
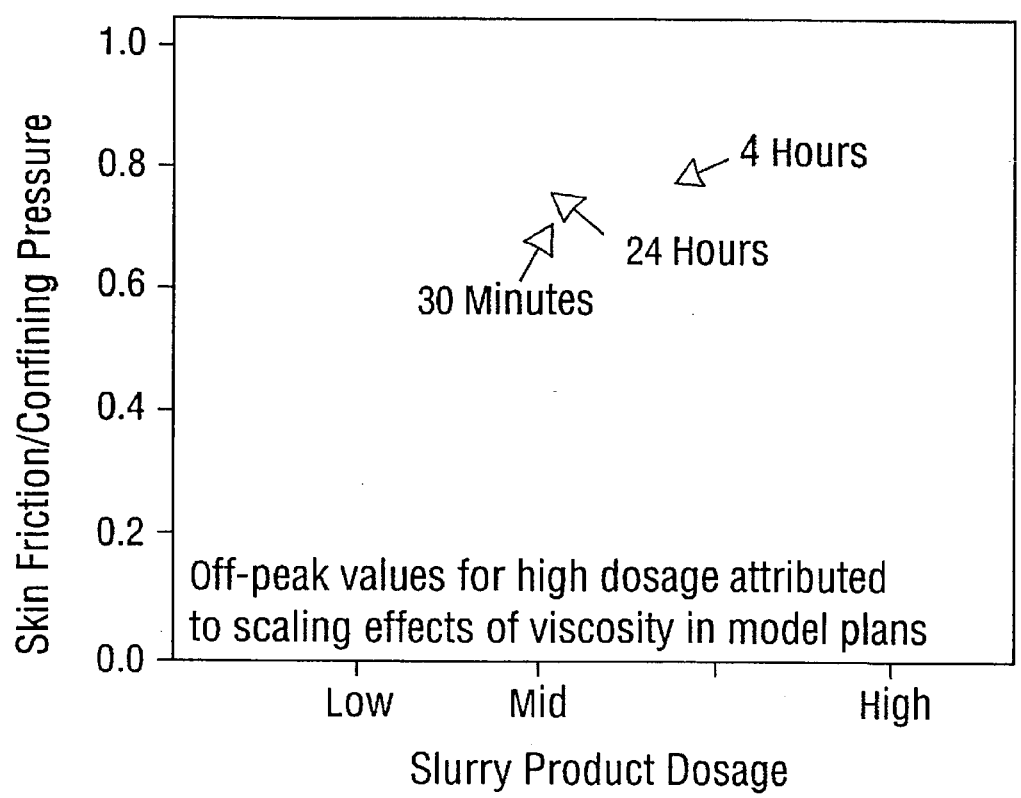
FIGS. 15, 16, 17, and 18 are graphic representations of the "skin friction development" of model bored piles constructed using the earth stabilization fluids of this invention in comparison to the prior art use of bentonite and attapulgite.
Figure 16:
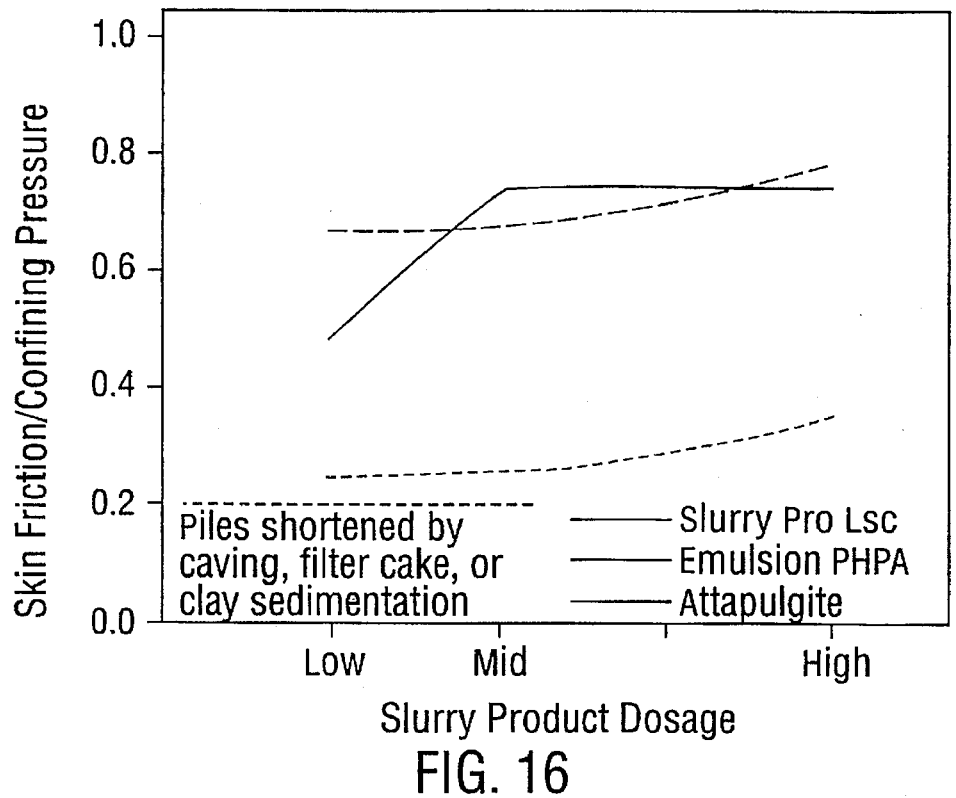
Figure 17:
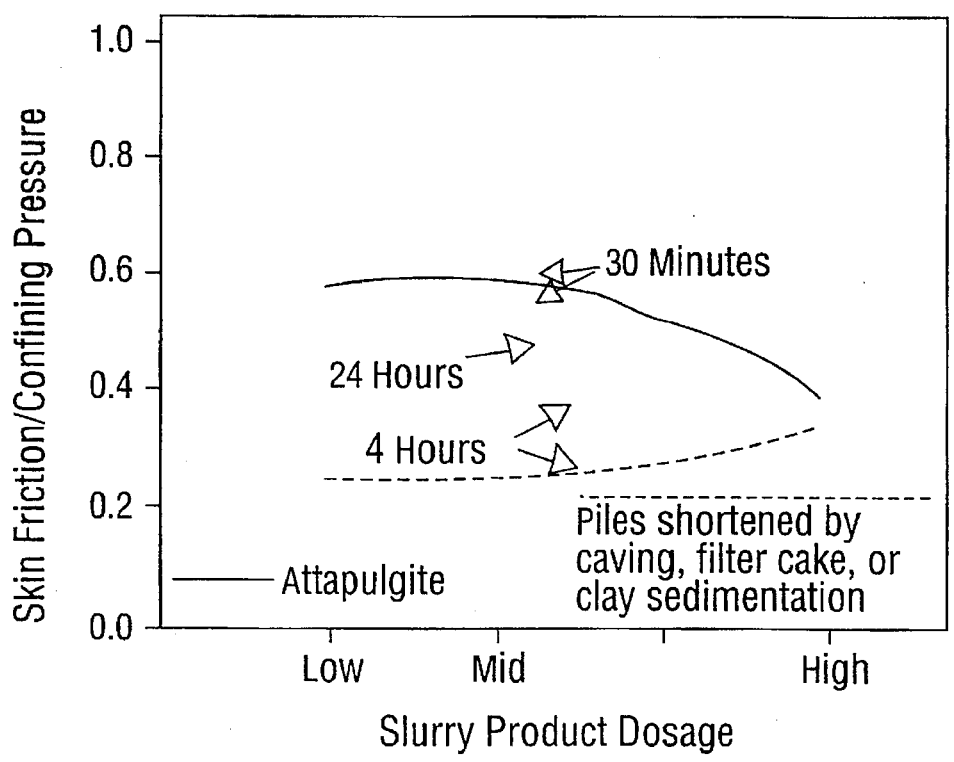
Figure 18:
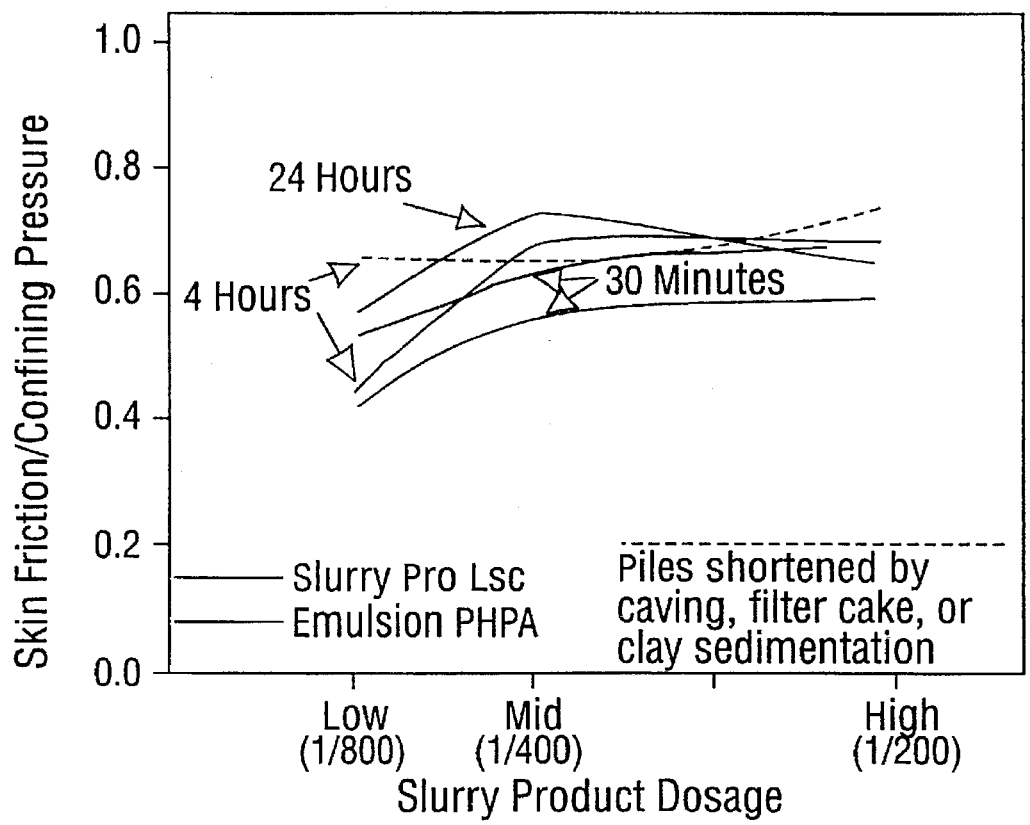
Figure 19:
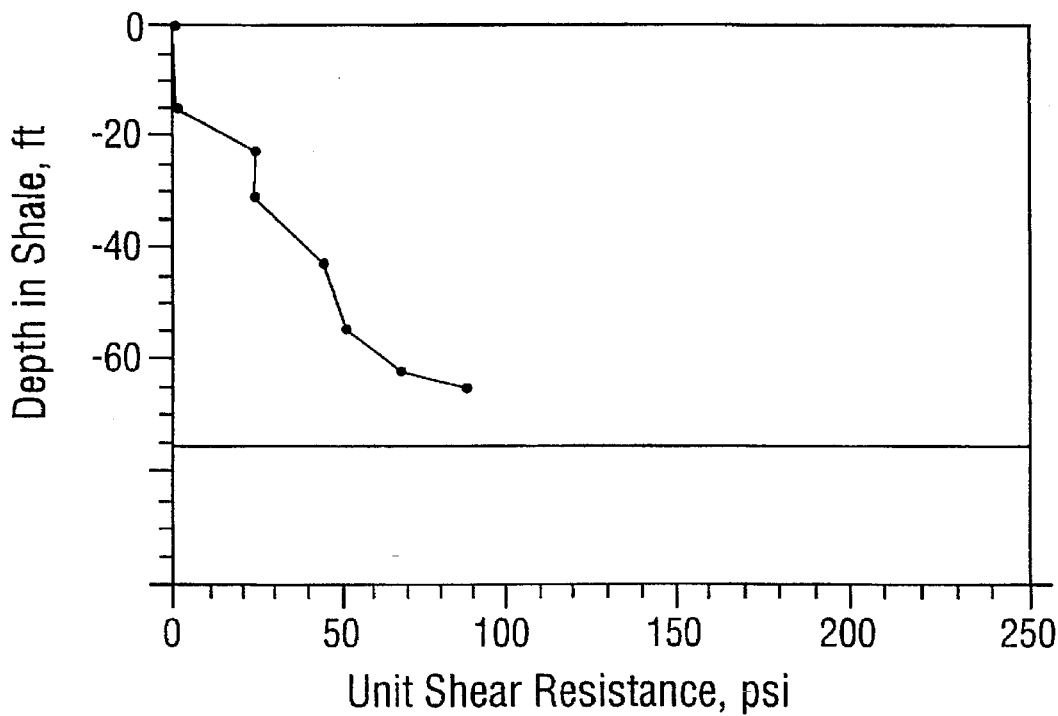
FIG. 19 is a graphic representation of load test results in a bored pile constructed using the earth stabilization fluids of this invention compared to the conventional use of bentonite.

FIG. 8 shows skin friction development of a preferred embodiment of the invention after 24 hours contact time in an experimental drilled shaft. The figure shows that the preferred embodiment outperformed bentonite in developing skin friction. The figure also shows, by omission when compared to FIG. 6, that slurries formulated from attapulgite and from emulsion PHPA failed to maintain a column of slurry in the experimental drilled shafts due to complete fluid loss. The polymer of the present invention developed the highest skin friction of the slurry formulations which were capable of maintaining fluid in the experimental drilled shaft for 24 hours.

In still another preferred embodiment of this invention, dry particles, flakes, agglomerates, or crystals of materials used to prepare a slurry are sorted or produced to consist of various size particulates or flakes, ranging in size from 0.01 mm to 50 mm, preferably 0.01 mm to 10.0 mm, and most preferably 0.10 mm to 2.5 mm as determined by screening with sieves having openings of these sizes. The dry particles, flakes, or crystals of materials used to prepare the slurry are of various sizes. The materials are produced, sorted and selected in various particle-size sub-ranges to optimize fluid loss control performance in specific types of granular, vugular or fractured earth formations having varying sizes of pores, vugs or fractures. The larger particle sizes are required for such porous formations as sand, gravels, cobbles and glacial tills. Less porous formations, such as hydratable shales, clays, and silts require smaller particle sizes. The choice of particle size is important in optimizing product efficiency in different formations. In a preferred embodiment of this invention, the particle size for the granular, flaked or agglomerated polymer ranges from 0.01 mm to 50 mm, preferably 0.01 mm to 10.0 mm, and most preferably 0.1 mm to 2.5 mm, with the majority by weight of the granules being between 0.40 mm and 2.5 mm.

All embodiments of this invention may be manufactured and used in liquid form, i.e., as an emulsion (oil-continuous or water-continuous), suspension form, dispersion form, solid form, or solution form. The preferred physical form for anionic acrylic-based polymers is dry granules, flakes or agglomerates.

One preferred embodiment of this invention is a polymer with anionicity ranging from approximately 35% to approximately 65% with a molecular weight in excess of 100,000, preferably in excess of one million and most preferably in excess of ten million, as measured prior to cross-linking, which is slightly crosslinked from 0.01% to 10% using either aldehyde, $C_1$ to $C_{25}$ alkylamines including diamine and triamine, and/or methylene his acrylamide. The polymer is either a copolymer of acrylamide and acrylic acid or maleic acid, maleic anhydride, or fumaric acid, or AMPS®, styrene sulfonic acid, vinyl sulfonic acid, methallylsulfonic acid, and their salts and any combination thereof. The molar ratio of these components can vary in order to achieve the desired anionicity for the particular formation and water conditions. Particle size for the granular polymer in most formation conditions should range from 0.01 mm to 10.0 mm with the majority of the particles being between 0.1 mm and 2.5 mm.

The invention can be expressed in a variety of preferred embodiments which incorporate various combinations of the attributes of the fluids and the methods described herein.

1. Single-Phase ("Smooth") Fluids

The water in the fluid is considered to be bound up intimately with one or more of the polymers, such that the continuous fluid phase is a solution or colloidal dispersion of one or more polymers. In some cases and under some conditions "free" water may exist in the fluids of the invention or may be liberated from masses of earth solids extracted from the fluids.

1a. In a first preferred embodiment an anionic polymer having a charge density of about 5% to 95%, more preferably 10% to 80%, and most preferably 30% to 80% and molecular weight of one million or greater, or preferably 10 million or greater is fully dissolved in water at concentrations of 0.7 g/L (active basis) or higher to create a single-phase fluid having Marsh Funnel Viscosity (MFV) higher than 60. The fluid is used for excavating, boring or well drilling operations in dry sand or gravel.

1b. In a second preferred embodiment an anionic polymer having a charge density of about 5% to 95%, more preferably 10% to 80%, and most preferably 30% to 80% and molecular weight of one million or greater, or preferably 10 million or greater is fully dissolved in water at concentrations of 0.7 g/L (active basis) or higher to create a single-phase fluid having Marsh Funnel Viscosity (MFV) higher than 45. The fluid is used for excavating, boring or well drilling operations in cohesive earth formations, or in moist or wet sand or gravel.

1c. In a third preferred embodiment a vinyl-based polymer containing cationic groups and having a molecular weight of about 25,000 or greater is fully dissolved in water at concentrations of 0.2 g/L (active basis) or higher to create a single-phase fluid having Marsh Funnel Viscosity (MFV) of 30 or higher. The fluid is used for excavating, boring or well drilling operations.

1d. In a fourth preferred embodiment an anionic polymer having a charge density of 3% to 90% and molecular weight of 100,000 or greater is fully dissolved in water at concentrations of 0.05 g/L (active basis) or higher to create a single-phase fluid having Marsh Funnel Viscosity (MFV) of 28 or higher. The fluid may also contain other additives such as cationic materials (e.g. polyamine) for rheological structuring. The fluid is used for excavating, boring, well drilling operations or other industrial application. The fluid is treated after preparation, whether in a vessel, an excavation, or other in-situ mode, with a soluble hydroxide in such a way that amide groups are hydrolyzed to acrylate groups, as evidenced by an increase in viscosity.

1e. In a fifth preferred embodiment an anionic polymer having a charge density of 3% to 90% and molecular weight of 100,000 or greater is fully dissolved in water at concentrations of 0.05 g/L (active basis) or higher to create a single-phase fluid having Marsh Funnel Viscosity (MFV) of 28 or higher. The fluid may also contain other additives such as cationic materials (e.g. polyamine) for theological structuring. The fluid is used for excavating, boring, well drilling operations or other industrial application. The fluid is treated after preparation, whether in a vessel, an excavation, or other in-situ mode, with a soluble hydroxide in such a way that amide groups are hydrolyzed to acrylate groups, as evidenced by an increase in viscosity. After such hydrolysis a buffer such as sodium bicarbonate, a phosphate or an acid is added to the system to slow or stop hydrolysis of the polymer.

1f. In a sixth preferred embodiment an anionic polymer having a molecular weight of about 25,000 or greater is fully dissolved in water at concentrations of 0.01 g/L (active basis) or higher. A cationic polyelectrolyte is added to the fluid to provide theological structuring of the fluid and create a single-phase fluid having Marsh Funnel Viscosity (MFV) of 28 or higher and a rheological profile which evidences said structuring effect. The fluid is used for excavating, boring, well drilling operations or other industrial application.

1g. In a seventh preferred embodiment a single-phase aqueous fluid is prepared from one or more anionic, amphoteric and/or cationic polymer(s) wherein buffers and variations in pH are used to control the structuring nature of the polymer(s). The fluid is used for excavating, boring, well drilling operations or other industrial application.

1h. In an eighth preferred embodiment a single-phase aqueous fluid is prepared from an amphoteric polymer(s) wherein cationic and anionic species are present as the same copolymer structure that responds differently at high and low pH conditions in copolymer systems based on a vinyl backbone. The fluid is used for excavating, boring, well drilling operations or other industrial application.

1i. In a ninth preferred embodiment, a single-phase aqueous fluid is prepared from hydrophobically modified copolymers, and long chain amines are used to pH-adjust carboxyl acid group-containing copolymer systems with a acrylic backbone. The fluid is used for excavating, boring, well drilling operations or other industrial application.

1j. In a tenth preferred embodiment an anionic polymer having a molecular weight of 10,000 or greater is fully dissolved in water at concentrations of 0.1 g/L (active basis)

or higher to create a single-phase fluid having Marsh Funnel Viscosity (MFV) of 28 or higher. The fluid is used for excavating, boring, or well drilling operations in an environment that causes the fluid to become contaminated by sea water or other source of soluble cations, especially magnesium. Sodium or other soluble hydroxide, preferably in liquid solution form and preferably of at least 25 % (w/w) active content (to provide density significantly greater than water), is added as a slug directly to the polymer fluid in the excavation and allowed to sink downward toward the source of the contamination. Dry or tablet-form hydroxide can also be used. The hydroxide reacts with the magnesium or similarly reactive cation to form insoluble hydroxides, removing the contaminating cation from the system and thus allowing the polymer to hydrate more fully and develop more viscosity. This effect can be accentuated in the presence of excess hydroxide by in-situ hydrolysis of the polymer, especially a polyacrylamide, to produce more carboxyl groups which associate with the available water to aid viscosity development or recovery. This technique can allow polymers such as polyacrylamides, which are sensitive to the divalent cations in sea water and brackish waters, to be used successfully to prepare and maintain viscous, high-performing earth support fluids when excavating in soils saturated with or in excavations subject to intrusion of such waters.

1k. In an eleventh preferred embodiment alkyl methacrylate esters (C 1 to C20) in acrylic backbone copolymers containing either anionic groups or cationic groups are added as rheological structurants to an excavating fluid which is based on an anionic, cationic or amphoteric water-soluble polymer. Such materials will form hydrophobically associated regions while other areas of the copolymer align to cationic or anionic surfaces of particles, i.e., carboxyl function to a cationic face of a mineral and thusly a cationic, amino type (DADMAC for example) to an anionic mineral edge. Cationic and anionic functions also can form ion pairs as well to enhance theological structuring or formation of a polymeric network.

1l. In a twelfth preferred embodiment polysaccharides, gums, biopolymers and combinations thereof may be used to adjust viscosity loading and lifting capacity of a fluid based on other polymers of the invention by altering theology to develop enhanced theological structure.

1m. In a thirteenth preferred embodiment fluids based on anionic etherified polysaccharides, gums, biopolymers and combinations thereof (e.g. CMC, carboxymethyl starch, etherified guar, xanthan) are dosed with cationically-charged polyelectrolytes or polymers to theologically structure the fluid. An example is a polyamine added to a CMC-based fluid.

2. Dual- or Multi-Phase ("Lumpy") Fluids

2a. In a fourteenth preferred embodiment an anionic or amphoteric vinyl or acrylic-based polymer having a molecular weight of 50,000 or greater and more preferably one million or greater is added to water at concentrations of 0.1 g/L (active basis) or higher to create a fluid having Marsh Funnel Viscosity (MFV) higher than 28. The fluid contains some partially-dissolved particles of the polymer, i.e. the polymer is not fully dissolved in the fluid. The fluid is used for excavating, boring or well drilling operations while a portion of the polymer is in a partially hydrated state.

2b. In a fifteenth preferred embodiment fluids based on anionic or amphoteric etherified polysaccharides, gums, biopolymers and combinations thereof (e.g. CMC, carboxymethyl starch, etherified guar, xanthan) are dosed with cationically-charged polyelectrolytes or polymers to create in the fluid discrete masses or pearls by interaction of the cationic additive with the continuous anionic or amphoteric phase. An example is a polyamine added to a CMC-based fluid. The fluid is used for excavating, boring, or well drilling operations.

2c. In a sixteenth preferred embodiment fluids based on anionic or amphoteric etherified polysaccharides, gums, biopolymers and combinations thereof (e.g. CMC, carboxymethyl starch, etherified guar, xanthan) are formulated to comprise a continuous phase of dissolved or hydrated polymer and also a discontinuous phase of partially hydrated or hydrating masses of the polymer, i.e. the polymer is not fully dissolved in the fluid. The fluid is used for excavating, boring or well drilling operations while a potion of the polymer is in a partially hydrated state.

2d. In a seventeenth preferred embodiment an anionic acrylic based polymer having a charge density of 3% to 90% and molecular weight of 100,000 or greater is added to water at concentrations of 0.05 g/L (active basis) or higher to create a fluid having Marsh Funnel Viscosity (MFV) of 28 or higher. The fluid may also contain other additives such as cationic materials (e.g. polyamine) for rheological structuring. The fluid contains some partially-dissolved particles of the polymer, i.e. the polymer is not fully dissolved in the fluid. The fluid is used for excavating, boring or well drilling operations while a portion of the polymer is in a partially hydrated state. The fluid may be treated after preparation, whether in a vessel, an excavation, or other in-situ mode, with a soluble hydroxide in such a way that amide groups are hydrolyzed to acrylate groups, as evidenced by an increase in viscosity.

2e. In a eighteenth preferred embodiment an anionic acrylic based polymer having a charge density of 3% to 90% and molecular weight of 100,000 or greater is added to water at concentrations of 0.05 g/L (active basis) or higher to create a fluid having Marsh Funnel Viscosity (MFV) of 28 or higher. The fluid may also contain other additives such as cationic materials (e.g. polyamine) for rheological structuring. The fluid contains some partially-dissolved particles of the polymer, i.e. the polymer is not fully dissolved in the fluid. The fluid is used for excavating, boring or well drilling operations while a portion of the polymer is in a partially hydrated state. The fluid may be treated after preparation, whether in a vessel, an excavation, or other in-situ mode, with a hydroxide in such a way that amide groups are hydrolyzed to acrylate groups, as evidenced by an increase in viscosity. After such hydrolysis a buffer such as sodium bicarbonate, a phosphate or an acid is added to the system to slow or stop hydrolysis of the polymer.

2f. In a nineteenth preferred embodiment an anionic acrylic based polymer having a charge density of 3% to 90% and molecular weight of 50,000 or greater is fully dissolved in water at concentrations of 0.05 g/L (active basis) or higher to create a single-phase fluid having Marsh Funnel Viscosity (MFV) of 28 or higher. The fluid is treated with a cationic polyelectrolyte (e.g. a polyamine) which reacts with the anionic continuous phase to create in the fluid discrete masses or pearls. The fluid is used for excavating, boring, or well drilling operations.

2g. In a twentieth preferred embodiment an anionic acrylic based polymer having a charge density of 5% to 95% and molecular weight of one million or greater is added to water at concentrations of 0.1 g/L (active basis) or higher to create a fluid having Marsh Funnel Viscosity (MFV) higher than 28. The fluid contains some partially-dissolved particles of the polymer, i.e. the polymer is not fully dissolved in the fluid. The fluid is treated with a cationic polyelectrolyte (e.g. a polyamine) which reacts with the anionic continuous phase and with the partially-dissolved masses or pearls of anionic acrylic based polymer to create in the fluid discrete masses or pearls. The fluid is used for excavating, boring or well drilling operations.

2h. In a twenty-first preferred embodiment an anionic acrylic based polymer having a charge density of 3% to 90% and molecular weight of 50,000 or greater is fully dissolved in water at concentrations of 0.05 g/L (active basis) or higher to create a single-phase fluid having Marsh Funnel Viscosity (MFV) of 28 or higher. The fluid is used for excavating, boring, or well drilling operations. The fluid is treated with a cationic material (e.g. a polyamine) which reacts with the anionic continuous phase and with suspended particles of earth solids to agglomerate or complex the earth solids into masses or networks which more readily settle by gravity or can be removed from the excavation by adhering to excavating tools.

2i. In a twenty-second preferred embodiment an anionic acrylic based polymer having a charge density of 5% to 95% and molecular weight of one million or greater is added to water at concentrations of 0.1 g/L (active basis) or higher to create a fluid having Marsh Funnel Viscosity (MFV) higher than 28. The fluid contains some partially-dissolved particles of the polymer, i.e. the polymer is not fully dissolved in the fluid. The fluid is used for excavating, boring or well drilling operations. The fluid is treated with a cationic polyelectrolyte (e.g. a polyamine) which reacts with the anionic continuous phase, with the partially-dissolved masses or pearls of anionic acrylic based polymer, and with suspended particles of earth solids to agglomerate or complex the earth solids into masses or networks which more readily settle by gravity or can be removed from the excavation by adhering to excavating tools.

2j. In a twenty-third preferred embodiment an anionic acrylic based polymer having a charge density of 5% to 95% and molecular weight of one million or greater is added to water at concentrations of 0.1 g/L (active basis) or higher to create a fluid having Marsh Funnel Viscosity (MFV) higher than 28. The fluid contains some partially-dissolved particles of the polymer, i.e., the polymer is not fully dissolved in the fluid. The fluid is used for excavating, boring or well drilling operations. The fluid is treated with a cationic material (e.g. a polyamine) which reacts with the anionic continuous phase and with the partially-dissolved masses or pearls of anionic acrylic based polymer, adding rheological structure to the fluid.

2k. Also within the scope of this invention is the use of other anionic polymers such as etherified polysaccharides, gums, biopolymers and combinations thereof (e.g. CMC, carboxymethyl starch, etherified guar, xanthan) as replacements for acrylic based polymer in embodiments 2g, 2h, 2i, and 2j above.

The present invention comprises a method of formulating and using polymer-based or polymer-containing earth support fluids which are capable of some or all of the following functions: controlling fluid loss, stabilizing the formation being excavated, improving loading and removal of earth by excavating tools, and allowing development of high concrete-to-formation friction coefficients. The methods may be used in subterranean construction operations, excavations, and well drilling wherein an earth support fluid or drilling fluid is used in a vertical, angled, or horizontal borehole, tunnel, trench, or other excavation.

Although particular detail embodiments of the apparatus have been described herein, it should be understood that the invention is not restricted to the details of the preferred embodiment. Many changes in design, configuration, and dimensions are possible without departing from the spirit and scope of the instant invention.

EXAMPLES

Laboratory Example One

Figure 7:
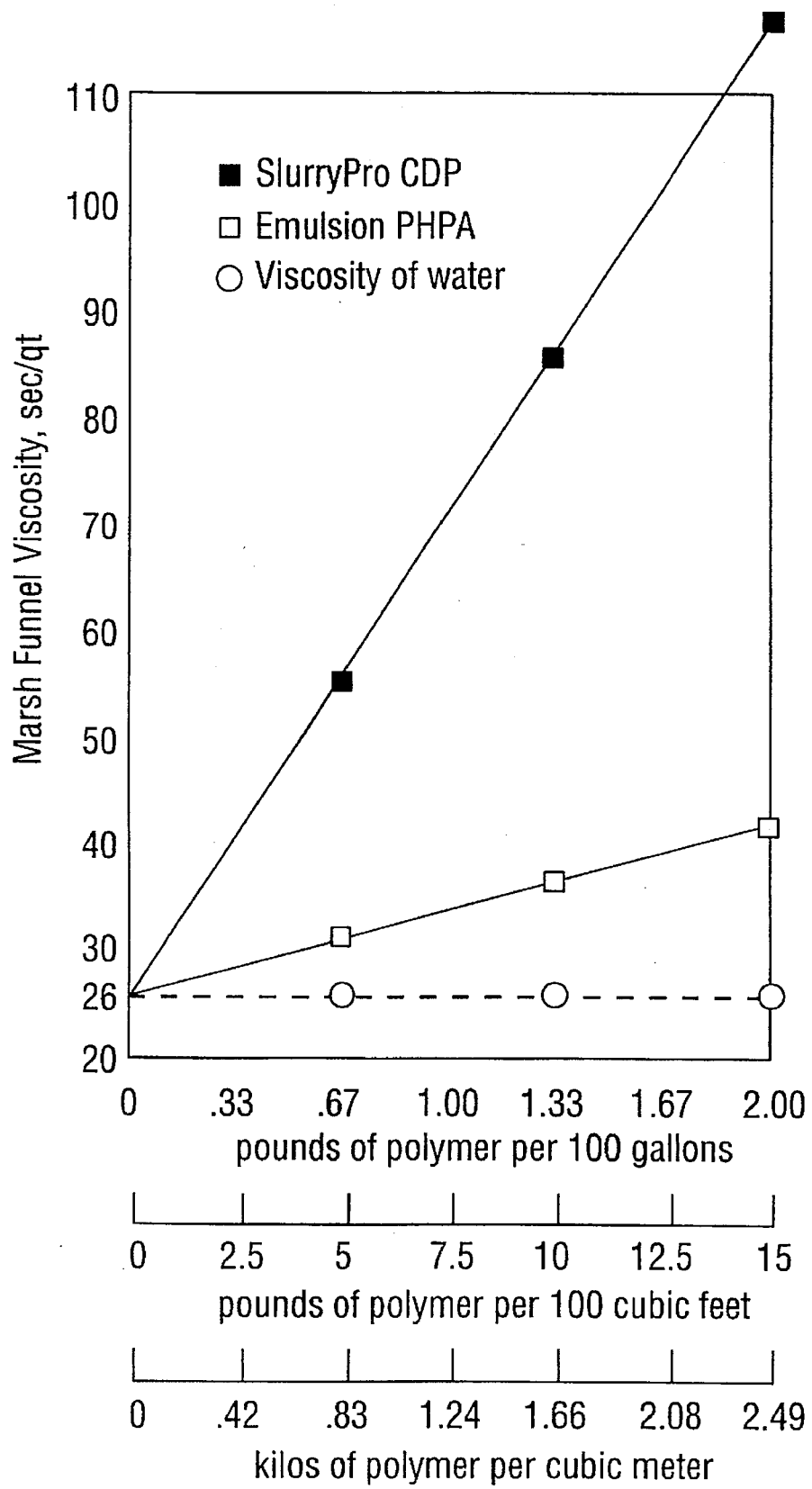
FIG. 7 is a graphic representation of viscosity development efficiency of CDP versus emulsion PHPA at high dosage ranges.

In a study conducted at the University of Houston several slurry materials were compared for their ability to stabilize model bored pile excavations in low cohesion sand for periods of 30 minutes, 4 hours, and 24 hours prior to concrete being poured. In addition the study focused on the quality and geometry of the finished cast-in-place model concrete piles and the amount of perimeter load shear developed by the pile after curing. The materials tested comprised (1) Super Mud™ an industry standard 30% anionic polyacrylamide emulsion with an active polymer content of approximately 30% (a product of Polymer Drilling Systems, Co.); (2) Attapulgite, a processed clay mineral; (3) Bentonite, a processed clay mineral; (4) SlurryPro® CDP™, a "dry vinyl" synthetic polymer of the invention, and (5) SlurryPro® LSC™, an emulsion based vinyl synthetic polymer of the invention. The SlurryPro polymers (4 and 5) are commercial products of KB Technologies Ltd ("KB"). KB specified that its SlurryPro polymers be mixed under low shear conditions utilizing a Lightnin'® type mixer with a paddle impeller running at 500 rpm for 20 minutes. KB also advised that the preferred dosage recommended for optimum overall performance was 1 gram of active polymer per liter of water and suggested testing at 2 grams of active polymer per liter of water as well to increase cohesion within the excavation sidewalls and the development of a pressure transfer vehicle. As a worst-case dosage, to see the effects of what KB felt would be inadequate polymer dosage, a concentration of 0.5 g/L was also tested. The leading supplier of polyacrylamide to the U.S. foundation construction industry advised the University of Houston to mix its product, Super Mud™ on a Hamilton Beach high speed mixer for 30 minutes with a dosage of 1 part emulsion polymer to 800 parts of water or about 0.375 grams of active polymer per liter. This is the standard dosage rate recommended by the supplier of the polymer for virtually all applications except dry sand and gravel. Based on the much higher polymer doses recommended for this test program by KB, and wanting to see the effects of higher doses of Super Mud than those recommended by its supplier, the University of Houston also tested this emulsion polyacrylamide at two times and four times the supplier's recommended dosage (0.75 and 1.5 g/L active basis, or 1/400 and 1/200 v/v as supplied) for comparison. The graph enclosed as FIG. 7 shows the results in Marsh Funnel Viscosity obtained by the University of Houston. These data illustrate the conventional emulsion polyacrylamide's inability to develop viscosities higher than about 43 seconds per quart even at very high dosages when used in accord with the prior art of the product's supplier, which represented the state of the art.

Figure 6:
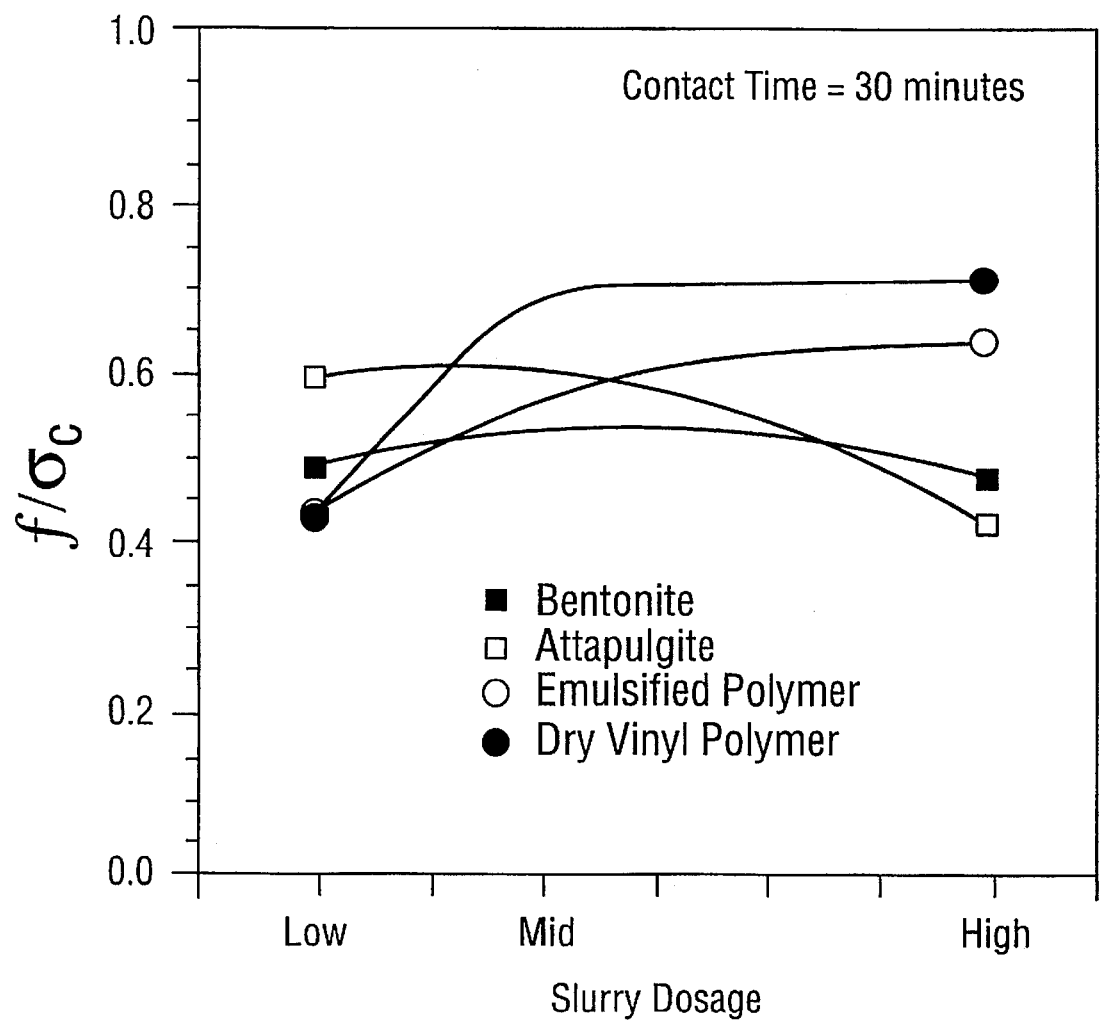
FIG. 6 is a graphic representation of a comparison of perimeter load transfer coefficients for various materials.

After the four slurry types described above were prepared, a model auger was used to drill holes under the slurries into sandy soil contained in a triaxial cell. A minimum of three model piles per variable (type of slurry, concentration of slurry, and duration of exposure time prior to pouring concrete) were constructed and tested. FIGS. 5, 6, and 8 show the amount of perimeter load shear developed versus dosage and excavation open time. This information clearly indicates that viscosity is very important as is polymer/soil structuring or adhesion within the excavation sidewalls for long term stabilization and improved perimeter load shear development. Of all material tested the KB SlurryPro polymers significantly outperformed all other types of slurry in both excavation stabilization and perimeter load shear development. Perhaps the most important information to emerge from this research program was the fact that polyacrylamide slurries, when used in accord with the standard and recommended state-of-the-art practice, produced poor results in terms of stabilizing the excavations, controlling fluid loss, producing geometrically correct cast-in-place piles, and allowing development of high perimeter load shear. Only when the polyacrylamide was used at dosage rate 200% to 400% of those recommended in the prior art did it approach the performance of the newer polymers and methods of KB Technologies as described in this patent. The conclusion to be drawn is that polyacrylamides were being used in inadequate concentrations and viscosities in the prior art.

More comprehensive information can be found in The University of Houston Department of Civil Engineering publication No. UHCE 93-1 entitled, *Effect of Mineral and Polymer Slurries on Perimeter Load Transfer in Drilled Shafts*, published in January 1993.

Laboratory Example Two

A fluid loss study was conducted utilizing a 500 cc filtration cell in which internal pressures could be controlled and which used an interchangeable bonded granular aloxite disk calibrated to specific darcy permeability ratings (e.g. 20 darcy, 50 darcy and 110 darcy). Nominal mean pore diameters were also specified for some of the disks (e.g. 60 microns for the 20-darcy dish). In this study polymer slurries containing a continuous and discontinuous phase were compared to polymer slurries with only a continuous phase and with bentonite slurries at a charged pressure of either 5 psi or 10 psi.

| Product | CDP | CDP | Super-Mud | Bentonite | CDP | LSC | CDP |
|---|---|---|---|---|---|---|---|
| Dosage Active | 1.0 g/l | 1.0 g/l | 1.0 g/l | 5.0 g/l | 1.0 g/l | 1.0 g/l | 1.0 g/l |
| Mix Time | 20 minutes | 10 minutes | 20 minutes | 24 Hours | 10 minutes | 20 minutes | 10 minutes |
| Additives | None | None | None | Caustic to pH 10.0 | Cationic polyamine 0.1 g/l | None | Cationic poly-DADMA c0.1 g/l |
| MFV | 50 sec | 48 sec | 43 sec | 33 sec | 56 sec | 52 sec | 54 sec |
| PSI | 10 | 10 | 10 | 10 | 10 | 10 | 10 |
| Darcy Permeability | 50 | 50 | 50 | 50 | 50 | 50 | 50 |
| Mixing Rate RPM's | 1,000 Gels absent | 1,000 Gels present | 1,000 Gels absent | Multi mixer 10,000 | 1,000 Gels present | 1,000 Gels absent | 1,000 Gels present |
| Time Minutes (ml) | | | | | | | |
| 1.0 | 50 | 12 | 69 | 10 | 8 | 48 | 9 |
| 2.0 | 78 | 21 | 135 | 16 | 14 | 75 | 16 |
| 3.0 | 121 | 25 | 205 | 22 | 21 | 116 | 23 |
| 4.0 | 163 | 30 | 270 | 27 | 25 | 155 | 26 |
| 5.0 | 205 | 33 | 329 | 32 | 30 | 198 | 31 |
| 6.0 | 249 | 36 | BO | 35 | 34 | 238 | 36 |
| 7.0 | 283 | 40 | | 38 | 37 | 270 | 39 |
| 8.0 | 338 | 43 | | 41 | 40 | 319 | 42 |
| 9.0 | 385 | 46 | | 43 | 43 | 367 | 44 |
| 10.0 | 430 | 49 | | 45 | 46 | 404 | 48 |
| 12.5 | BO | 56 | | 51 | 49 | 441 | 52 |
| 15.0 | | 63 | | 57 | 53 | BO | 56 |
| 17.5 | | 69 | | 62 | 56 | | 59 |
| 20.0 | | 76 | | 68 | 60 | | 63 |
| 22.5 | | 80 | | 74 | 64 | | 68 |
| 25.0 | | 83 | | 79 | 65 | | 73 |
| 27.5 | | 87 | | 82 | 68 | | 78 |
| 30.0 | | 90 | | 86 | 71 | | 83 |
| 35.0 | | 96 | | 89 | 79 | | 90 |
| 40.0 | | 99 | | 98 | 88 | | 99 |
| 50.0 | | 108 | | 110 | 108 | | 105 |
| Product | CDP | CDP | Super-Mud | CDP | CDP | CDP | CDP |
| Dosage Active | 2.0 g/l | 2.0 g/l | 0.375 g/l | 1.0 g/l | 1.0 g/l | 1.0 g/l | 1.0 g/l |
| Mix Time | 20 minutes | 10 minutes | 20 minutes | 10 minutes | 10 minutes | 10 minutes | 10 minutes |
| Additives | None | None | None | Cationic-polyamine 0.2 g/l | Cationic-polyacrylamide 80% 0.15 g/l | Cationic poly-DAD-MAC 0.2 g/l | Cationic dry polyacrylamide 0.2 g/l |
| MFV | 101 sec | 89 sec | 33 sec | 76 sec | 58 sec | 70 sec | 53 sec |
| PSI | 10 | 10 | 10 | 10 | 10 | 10 | 10 |

-continued

| Darcy Permeability | 50 | 50 | 50 | 50 | 50 | 50 | 50 |
|---|---|---|---|---|---|---|---|
| Mixing Rate RPM's | 1,000 Gels absent | 1,000 Gels present | 1,000 Gels absent | 1,000 Gels present | 1,000 Gels present | 1,000 Gels present | 1,000 Gels present |
| Time Minutes (ml) | | | | | | | |
| 1.0 | 21 | 7 | 103 | 6 | 9 | 11 | 10 |
| 2.0 | 40 | 11 | 221 | 10 | 17 | 21 | 19 |
| 3.0 | 62 | 16 | 338 | 15 | 24 | 27 | 25 |
| 4.0 | 83 | 21 | 451 | 20 | 29 | 33 | 31 |
| 5.0 | 101 | 25 | BO | 24 | 34 | 39 | 34 |
| 6.0 | 123 | 29 | | 29 | 40 | 46 | 39 |
| 7.0 | 145 | 33 | | 32 | 45 | 54 | 43 |
| 8.0 | 167 | 37 | | 36 | 51 | 61 | 46 |
| 9.0 | 189 | 40 | | 39 | 55 | 68 | 48 |
| 10.0 | 205 | 42 | | 42 | 59 | 77 | 50 |
| 12.0 | 229 | 44 | | 44 | 63 | 83 | 52 |
| 15.0 | 251 | 46 | | 45 | 67 | 89 | 54 |
| 17.5 | 274 | 47 | | 47 | 71 | 94 | 55 |
| 20.0 | 299 | 49 | | 49 | 76 | 98 | 58 |
| 22.5 | 321 | 51 | | 51 | 80 | 103 | 60 |
| 25.0 | 344 | 53 | | 52 | 84 | 106 | 62 |
| 27.5 | 369 | 55 | | 53 | 85 | 109 | 63 |
| 30.0 | 392 | 58 | | 54 | 89 | 112 | 65 |
| 35.0 | 453 | 64 | | 59 | 92 | 115 | 69 |
| 40.0 | BO | 70 | | 64 | 95 | 118 | 74 |
| 50.0 | | 75 | | 68 | 98 | 121 | 77 |

Laboratory Example Three

A solids removal study was conducted utilizing polymeric slurries contaminated with Houston soil taken from outside the laboratory. Each slurry was prepared by mixing on a Lightnin' mixer with a paddle-type impeller. One liter of water was first added to the beaker and stirred at 500 rpm. To the water 40 grams of Houston soil were added and dispersed. To this water-soil mixture 0.3, 0.6, 1.0 and 1.5 grams of SlurryPro® CDP™ and Super Mud® polymer on an active weight basis were added and allowed to mix for 30 minutes. After mixing for 30 minutes the soil-contaminated slurries were transferred to 2.0 liter graduated cylinders. To the graduated cylinder was added polyamine, polyacrylamide in the form of Quick Floc™ emulsion from Polymer Drilling Systems Company, and polyDADMAC. The polyamine and the polyDADMAC were diluted to five percent solutions. The Quick Floc was added according to the supplier's instructions, direct to the slurry in concentrated form. On all samples with Marsh Funnel viscosities in excess of 45 seconds per quart the Quick Floc polyacrylamide did not produce discernible flocculation even at elevated dosages. The dosages utilized ranged from 0.5 cc to 10.0 co. Quick Floc worked best on the slurry samples with MF viscosities less than 40 seconds per quart. Additions of between 1.5 cc and 5.0 cc per liter produced low-density, loose or fluffy small agglomerates which were difficult to remove from the slurry with a spoon. Significant amounts of solids remained in the slurry after several attempts to pick it up the flocculated material with a spoon.

The polyamine and polyDADMAC solutions worked in all cases with each type of polymer slurry. One concern noted with the polymer slurries made with low doses of polymer was that the addition of both of these materials (polyamine or polyDADMAC) significantly reduced the MF viscosity. However, in the samples with 1.0 and 1.5 grams of polymer the two cationic solution polymers were very effective at cleaning virtually all entrained solids from each slurry with little to no impact on the Marsh Funnel viscosity. The dosages utilized ranged from 0.5 cc to 10.0 cc of the 5% solutions per liter of polymer fluid. Additions of between 2.0 cc and 5.0 cc appeared to work best in the higher viscosity fluids. The entrained soil very quickly attached to the cationic/anionic polymer structure, forming a continuous mass of agglomerated soil which was readily removed from the slurry with the spoon. The polymer/soil agglomerate actually demonstrated a strong tendency to wrap around and attach to the spoon in a large mass as the spoon was rotated. All slurries treated with the polyamine and the polyDADMAC were completely cleaned of entrained soil with one to three passes of the spoon.

Field Example One

A dry granular water-soluble polymer slurry of the present invention was tried under a field test in Seattle, Wash. The field test drilled over twenty soldier piles for the foundation of a building. The new dry polymer demonstrated very good performance in comparison to an industry-standard oil continuous phase emulsion polymer with an average charge density of 30% anionic, which had previously been used, and displayed advantages in controlling fluid loss to the borehole, cleaning the hole and loading the auger, simplifying polymer handling and addition, increasing drilling efficiency, and reducing polymer waste and environmental impact. This initial application of the polymer was successful and indicates that the novel dry polymer may be a valuable new tool for the foundation drilling industry.

Small quantities of a dry granular polymer of the present invention, CDP solid, (now commercially referred to as SlurryPro CDP) and a liquid emulsion analog of the present invention, CDP Liquid, were supplied. Of fourteen soldier pile holes, nine were drilled with the new dry polymer, CDP Solid, three were drilled with the liquid analog, CDP Liquid, and two were drilled with the industry standard 30% anionic PHPA emulsion polymer.

The soldier pile holes drilled with slurries prepared from the three different polymers ranged in diameter from 30 inches to 42 inches, and in depth from 28 feet to 42 feet. The formation was glacial till, poorly sorted, with lenses of sand, layers of silty clayey sand, and sandy silt with cobbles and gravel. Water was encountered at various depths within the boreholes, and in some holes strong water flows were encountered. One hole was a re-drilling or reaming-out of a water extraction well previously drilled on the property to help lower the water table on site.

The competitive test showed that the polymers of the invention had advantages over the conventional emulsion polymer with the dry form of the invention demonstrating advantages in ease of use. The advantages included: superior control of fluid loss to the borehole; greater ease of use by the drilling crew; reduced product requirement [the dry polymer replacing the conventional polymer emulsion on a 1:6 basis]; reduced wastage; increased rate of penetration; improved cohesive loading of drilled earth solids on the excavation tool, and reduced environmental pollution.

Field Example Two

In the same field test in Seattle, Wash. described above, three of the over twenty soldier piles where drilled with a conventional industry-standard oil continuous phase emulsion PHPA polymer with an average charge density of 30% anionic (sold commercially as Super Mud$^a$), and another three were drilled with CDP Liquid (now commercially referred to as SlurryPro LSC). SlurryPro LSC demonstrated significantly better viscosity building capabilities than the conventional emulsion polymer. Equal dosages of each polymer at the rate of one part polymer to 200 parts water yielded the following Marsh Funnel viscosities:

SlurryPro LSC . . . 64 sec./quart

Conventional polymer . . . 42 sec./quart

We then added an additional one part polymer to 400 parts of polymer slurry as prepared above. We mixed the slurries for thirty minutes and obtained the following Marsh Funnel viscosities:

SlurryPro LSC . . . 88 sec./quart

Conventional polymer . . . 53 sec./quart

In drilling these six holes with the higher viscosity slurries we were not able to hold solids on an auger with the conventional emulsion PHPA polymer and had to use a drilling bucket. With each of the three SlurryPro LSC holes we successfully drilled using an auger. The auger was fully loaded with earth solids after each grab. Additionally, the LSC holes consumed less overage of concrete vs. the emulsion PHPA polymer holes. This difference in concrete overrun averaged nine percent on the LSC holes as compared to an average of 17.5 percent on the emulsion PHPA polymer holes. This indicated that LSC was producing a more stable hole due to the soil/polymer matrix being formed within the excavation side wall. The increased earth binding capacity of LSC at this higher viscosity was also demonstrated through the successful use of the auger to complete all three excavations.

Field Example Three

In a field test conducted in Owensboro, Ky., the Kentucky Transportation Cabinet and the FHWA allowed and oversaw all testing for KB Technologies to construct two identical drilled shafts (cast-in-place concrete piles) on the same site. These holes were both caliper logged and load tested. The first hole was drilled using SlurryPro CDP at an average viscosity of 40. The second hole was drilled using CDP at an average viscosity of 55. The formation was a very water sensitive weathered shale. Both the caliper logs and load tests clearly showed the benefits of the increased viscosity and polymer concentration used in the second hole. The hole drilled with the higher viscosity fluid has significantly improved side wall stability and gauge as seen in the caliper logs, and significantly higher perimeter load shear results as seen in the load tests. The results of the tests run are graphically represented by FIGS. 9a and 9b, 10a and 10b and 19 of this application.

Field Example Four

In a field study conducted at the Hyperion Waste Treatment facility in Los Angeles, Calif., a contractor drilled more than 100 soldier pile holes using the conventional emulsion PHPA polymer (Super Mud). Subsequently, more than 60 holes were drilled at the same site using SlurryPro CDP. The soil conditions were cohesionless sand with the water table at approximately minus 40 feet. The site was within a few hundred yards of the Pacific Ocean, making the ground water brackish. On the approximately 100 shafts drilled with the conventional emulsion PHPA polymer, very high rates of fluid loss occurred, with attendant problems of poor borehole stability. Each hole drilled required approximately 5.7 times its nominal volume in slurry, as the polymer slurry bled into the loose sand at high rates throughout the drilling process. The contractor decided to use fluids formulated with SlurryPro CDP according to the techniques of KB Technologies for the remainder of the project, in an attempt to improve productivity and performance. During the period of excavating with the conventional emulsion PHPA polymer the contractor encountered significant concrete overruns as well as several collapsed holes. The contractor was running the slurry at a Marsh Funnel viscosity of approximately 48 and dosing the polymer at the rate of one part PHPA to 200 parts of water. The polymer was premixed into the water using a "jet gun" eductor supplied by the PHPA supplier. This reduced viscosity development indicated the salt water was suppressing the viscosity development of the PHPA polymer. All PHPA polymer holes had to be drilled with digging buckets as opposed to an auger as the sand would not stay on the auger.

When the contractor switched to SlurryPro CDP slurry Marsh Funnel viscosity was increased to approximately 95 seconds and an auger was successfully utilized to excavate all holes. The CDP polymer was added directly to the mouth of the excavation on a stream of water. The auger loadings were heavy and on most withdrawals of excavated sand only the outer few millimeters were invaded by slurry. Inside the outer polymer/soft layer the sand was dry or wet from naturally occurring water. In addition to improved excavation rates as compared to the holes drilled with the conventional PHPA polymer slurry, fluid loss was significantly reduced. Excavation fluid requirements fell from 5.7 hole volumes per hole to 1.4 hole volumes, and hole stability was greatly enhanced. This was a direct result of the increased viscosity of the CDP slurry and the gel masses and high-viscosity polymer fluid effectively plugging the side walls of the excavation and establishing a permeated zone of reduced hydraulic conductivity at the soil/excavation interface, i.e., a pressure transfer zone. Concrete consumption was also significantly reduced on the CDP shafts to within ten percent of nominal gauge.

Field Example Five

In a field study conducted at the Mission Valley Viaduct site in San Diego, Calif. under the direction of Caltrans, several foundation bored piles were constructed. Soil conditions were low cohesion sand/silt to cohesionless sand to cobbles/sand to sand/clay. The hole was started with a SlurryPro CDP fluid with an average Marsh Funnel viscosity of 75 seconds per quart. The pH of the slurry was approximately 7.0 as measured with colorimetric pH strips. An auger was used to drill the borehole. At a depth of approximately 42 feet a water-saturated cobble/sand layer was penetrated. At 42 to 45 feet the loading of earth onto the auger became significantly reduced and more wet. It was visually obvious that the slurry viscosity was significantly degraded. A sample of the slurry was take from approximately 44 feet in depth. The sample's Marsh Funnel Viscosity had fallen to 36 seconds per quart. Hardness testing for calcium and magnesium confirmed the water was very hard as both readings were in excess of 1,000 ppm. Chlorides were then checked and found to be over 10,000 ppm. This indicated we were in a salt water table. The excavation was 48 inches in diameter and approximately 45 feet deep. One five gallon pail of 50% sodium hydroxide solution was added directly to the excavation and slurry in the excavation was stirred using an auger. The pH was rechecked and found to be approximately 11.0 using colorimetric pH strips. Within two to three minutes of having added the caustic the slurry viscosity had significantly recovered and was now running at a Marsh Funnel viscosity of 71 seconds per quart. 150 pounds of sodium bicarbonate was then added to buffer the system as well as to sequester any residual calcium. After the addition of the bicarbonate the pH dropped to 10.0 and the viscosity increased to 81 seconds per quart. This recovery of slurry viscosity without the addition of any additional SlurryPro CDP directly indicates that the use of hydroxyl not only sequestered any free cations present, but also indicates that hydroxyl will pull cations from carboxyl groups freeing them for reuse and will also hydrolyze existing amide groups in-situ to carboxyl groups. This hydrolysis is stopped by the addition of either a weak acid or more preferably by the addition of sodium bicarbonate which (1) neutralizes excess hydroxyl groups to water and (2) precipitates any free calcium under a pH of 10.7 as it is released from the hydroxyl form. This same approach was applied to all subsequent holes with complete success.

Field Example Six

In a field study conducted at the Hwy. 10 and Police Station site in New Orleans, La. under the direction of the Louisiana Department of Transportation and the FHWA. A single test pile was constructed and load tested using SlurryPro CDP. The soil conditions were cohesionless sand with calcareous marine shell fragments to approximately 32 feet followed by marine clay/sand. The water table was four feet below surface. Makeup water was soft and of good quality, being municipal potable water. The excavation (approx. 36 inches in diameter) was begun with water and SlurryPro CDP being added directly to the excavation. At ten feet of depth the first hardness and salinity tests were taken, showing high levels of calcium (in excess of 700 ppm) and significant amounts of free iron (in excess of 250 ppm). This indicated that the ground water was contaminated with these elements. Slurry pH in the excavation was 6.5. The excavation fluid Marsh Funnel viscosity was 51 seconds per quart it a dosage rate of 1.5 kilos per cubic meter (1.5 g/L). This was far below the expected viscosity this dosage, and the viscosity deficit was attributed to the calcium and iron contamination from the ground water. About 300 milliliters (ml) of 50 % sodium hydroxide solution was added to the approximately 500 gallons of slurry in the hole, and the slurry was mixed with the auger, raising the pH to 11.5. After a few minutes 20 pounds of sodium bicarbonate were added to (1) neutralize any remaining hydroxyl groups, lowering the pH and shutting down hydrolysis of amide groups to carboxyl groups and (2) to precipitate any free calcium present as the pH fell. The slurry viscosity jumped from 51 seconds per quart to 83 seconds per quart, confirming the revitalization of carboxyl groups by this treatment. Caustic and bicarbonate were intermittently added throughout the excavating process to assure that all hardness was sequestered or precipitated and to hydrolyze amide groups and/or reactivate contaminant-loaded carboxyl groups to maximize polymer viscosity. SlurryPro CDP was used at a rate of 1.3 kilos per cubic meter, with an average Marsh Funnel viscosity of 96 seconds per quart for the remainder of the excavation. The hole was drilled to a total depth of about 60 feet.

The hole had to be held overnight due to load test equipment not arriving the first day. The viscosity was raised to 112 seconds per quart before leaving the hole for the evening. Upon returning the next morning the hole was very stable and overnight fluid loss had been only about two vertical feet. The excavation depth was at the same point as the day before, indicating perfect hole stability with no caving or sloughing. Clean out passes were made and the hole was the sampled from the bottom. The slurry tested to be 113 seconds per quart and the sand content was approximately one percent. Concrete was then placed through the slurry and a very clean interface was noted as the concrete rose to the surface. Concrete consumption was only 6% over theoretical volume, indicating a very in-gauge hole. The load tests indicated that the pile significantly surpassed expected perimeter load shear results indicating that the pile was had significantly higher load capacity than piles drilled with bentonite or the conventional emulsion PHPA.

Field Example Seven

In a field study conducted on a power line site in Ocala, Fla. under the direction of Ocala Power & Lighting, two 108-inch diameter shafts were-constructed. One shaft was begun with the conventional emulsion PHPA polymer. At 21 feet of depth the hole was determined to be unstable and the construction company was experiencing severe fluid loss. The hole could not be maintained full of slurry. Nine five-gallon pails of the conventional emulsion PHPA polymer had been added to the excavation along with 250 pounds of sodium carbonate to precipitate any calcium present and to raise the pH. The fluid viscosity was at 34 seconds per quart with a pH of 11.0. A drilling bucket was being used throughout the excavation as solids could not be held on an auger.

KB was then asked to assist in saving the shaft, using materials and methods of the invention. Initially KB added seven gallons of 50% sodium hydroxide solution, which did not measurably change the pH, but increased the viscosity from 34 to 68 seconds per quart (no additional polymer added). Secondly 100 pounds of sodium bicarbonate were added to slow or stop any continuing hydrolysis of the polymer and to reduce the pH to 10.0. Fifteen pounds of SlurryPro CDP where then added with water, and the hole stabilized and the slurry level rose to within a few feet of the top of the excavation. The hole was then completed successfully with CDP and small additional amounts of caustic and bicarbonate to a depth of 58 feet. The drilling bucket was also replaced with an auger, significantly increasing excavation speed and reducing slurry wastage. The hole was held overnight and concreted the next morning prior to starting the second hole.

The next day a 108-inch diameter hole was drilled using SlurryPro CDP from the start. Caustic and bicarbonate were used to adjust the slurry pH to 10 and to reduce hardness within the slurry throughout the excavation operation. The hole was drilled with an average Marsh Funnel viscosity of 72. Soil conditions were water sensitive clay/sand and shells. The hole was drilled to completion at 65 feet in six hours with an auger. At completion there was a sand content of 1.25 percent at the bottom of the excavation. Two slugs of approximately 15 ounces each of KnockOut™ MA, a cationic polyelectrolyte, were added to the excavation by being poured into the water transfer flow. The auger was used to slowly rotate and swab the hole. Three passes were made with the auger. Each pass of the auger brought out highly loaded solids loads without the auger being pushed into the soil. The solids which were suspended in the fluid column and settling near the bottom were evidently being attracted to the auger due to networking with the cationic material, and the auger was acting as a "magnet" for earth solids. After swabbing the hole the slurry changed from opaque gray (due to suspended frees) to fairly water clear in appearance. The sand content on the bottom of the hole had also been reduced to less than 0.2 percent during the three quick passes. The hole was then left overnight.

Upon returning the next morning the excavation was rechecked for depth and measured to 1/16th of an inch of the depth recorded the evening before. The hole was then poured with a 6% overpour, indicating that the excavation was essentially gauge.

Field Example Eight

A field study was conducted on a trial site in Jacksonville, N.C. under the direction of the North Carolina Department of Transportation. Upon arrival at the site it was determined that the make-up water being taken from a river just upstream from the ocean was essentially sea water. Caustic and bicarbonate were used to pretreat the sea water and soften it, however we had not anticipated sea water and could only lower the soluble hardness to approximately 1,300 ppm. SlurryPro CDP was then premixed in a 3,000 gallon make-up tank with this treated water and yielded a 51 second per quart viscosity at a dosage rate of 1.4 kilos per cubic meter. Due to this lower viscosity caused by cationic contaminants in the water a decision was made to add half a pint of KobbleBlok, a cationic polymer, to the CDP/water premix tank. This caused the viscosity to increase from 51 seconds to 101 seconds per quart as measured by the Marsh Funnel. This increase in viscosity indicated significant structuring within the CDP slurry due to the addition of the cationic polymer. Additionally, auger loadings significantly increased in weight as did excavation stability.

Field Example Nine

In a field study conducted on a trial site in Scottsdale, Ariz. under the supervision of Barnard Construction Company, a polymer and method of the invention were used to achieve successful results in slurry-excavating a trench in fine-grained a silt/sand/cobble soil. After initially trying an emulsion PHPA (E-Z Mud®, supplied by Barold Corporation) without success, a dry polyacrylamide of the invention and an application method of the invention were used. Whereas the emulsion polymer, selected and applied according to the knowledge of the prior art, allowed excessive fluid loss and failed to stabilize the soil, the dry PHPA, selected and applied with the knowledge of the invention, provided good performance.

Although particular detailed embodiments of the apparatus have been described herein, it should be understood that the invention is not restricted to the details of the preferred embodiment. Many changes in design, configuration, and dimensions are possible without departing from the spirit and scope of the instant invention.

What is claimed is:

1. An earth stabilization fluid for use in excavating earth cavities, comprising an aqueous continuous phase, said aqueous phase containing a combination of one or more polymers, said combination of polymers containing anionic functional groups and cationic functional groups, said earth stabilization fluid being characterized by a Marsh Funnel viscosity greater than 35 seconds per quart and being effective to form a functional network at the interface of an excavation cavity and said earth stabilization fluid.

2. The earth stabilization fluid of claim 1 wherein one said polymers includes one or more associative monomers capable of copolymerization by a free-radical mechanism.

3. The earth stabilization fluid of claim 2 wherein said associative monomer is selected from the group consisting of urethane, amide, and ester derivatives of non-ionic surfactants and combinations thereof.

4. The earth stabilization fluid of claim 1 wherein one of said polymers is a polymeric reaction product of monomers selected from the group consisting of: acrylic acid, acrylamide, methacrylamide, methacrylic acid, maleic acid, maleic anhydride, fumaric acid, itaconic acid, vinyl sulfonic acid, styrene sulfonic acid, 2-acrylamido-2-methylpropane sulfonic acid, methallylsulfonic acid, vinyl acetic acid, allylacetic acid, B-hydroxy ethyl acrylate, 4-methyl-4-pentanoic acid, x-haloacrylic acid, B-carboxyethyl acrylate, C1 to C20 methacrylates and acrylates, water soluble salts thereof; and combinations thereof.

5. The earth stabilization fluid of claim 4 wherein said polymer has a molecular weight greater than 10,000.

6. The earth stabilization fluid of claim 4 wherein said polymer has a molecular weight greater than 500,000.

7. The earth stabilization fluid of claim 1 wherein at least one of said combination of one or more polymers is cross linked between 0.0% and 10% based on total monomer weight.

8. The earth stabilization fluid of claim 1 wherein one or more polymers is a natural polymer or a modified natural polymer.

9. The earth stabilization fluid of claim 1 wherein one or more of said polymers is a polymeric reaction product of one or more monomers selected from the group consisting of acrylamide, 2-methacrylamido-2-methyl propane sulfonic acid, styrene sulfonic acid, vinyl sulfonic acid, sulfoalkylacrylates, alkylmethacrylates, n-sulfoalkyl acrylamides, methacrylamides, allyl sulfonic acid, methallyl sulfonic acid, allyl glycidyl ether sulfonate, their salts and mixtures thereof.

10. The earth stabilization fluid of claim 1 wherein one or more said polymers is a polymeric reaction product of one or more monomers selected from the group consisting of methacryloxy ethyl dimethyl amine, methacrylamido propyl dimethyl amine, acryloxy ethyl dimethyl amine, acrylamido methyl propyl dimethyl amine, dimethyl diallyl ammonium chloride, diethyl diallyl ammonium chloride, dimethyl allyloxyethyl amine, and the acid salts and the methylsulfate and methyl chloride analogs thereof, and mixtures thereof.

11. The earth stabilization fluid of claim 1 wherein one or more said polymers includes one or more cationic monomer, said cationic monomer being selected from the group consisting of diallyldimethyl ammonium chloride, quaternized dimethylaminoethyl (meth)acrylates, N,N-dimethylaminopropyl methacrylamide, the water soluble salts thereof, and combinations thereof.

12. The earth stabilization fluid of claim 1 wherein one or more of said polymers is a cationic polymer, said cationic polymer being polyethylene imine.

13. The earth stabilization fluid of claim 1 wherein at least one of said one or more polymers is a polymeric reaction product of one or more non-ionic monomers, said non-ionic monomers being selected from the group consisting of: acrylamide, methacrylamide, N-vinyl pyrrolidone, vinyl acetate, styrene, N-vinyl formamide, N-vinyl acetamide, the water soluble salts thereof, and combinations thereof.

14. An earth stabilization fluid for use in excavating earth cavities comprising, an aqueous continuous phase containing a combination of one or more polymers, said combination of polymers containing anionic functional groups and cationic functional groups, said earth stabilization fluid being characterized by a Marsh Funnel viscosity greater than 35 seconds per quart and being effective to form a plurality of functional elements in said earth stabilization fluid.

15. The earth stabilization fluid of claim 14 wherein said functional elements comprise composition pearls, composition masses, polymeric networks and combinations thereof.

16. The earth stabilization fluid of claim 14 wherein one of said polymers includes one or more associative monomers capable of copolymerization by a free-radical mechanism.

17. The earth stabilization fluid of claim 16 wherein said associative monomer is selected from the group consisting of urethane, amide, and ester derivatives of non-ionic surfactants and combinations thereof.

18. The earth stabilization fluid of claim 14 wherein one of said polymers is a polymeric reaction product of monomers selected from the group consisting of: acrylic acid, acrylamide, methacrylamide, methacrylic acid, maleic acid, maleic anhydride, fumaric acid, itaconic acid, vinyl sulfonic acid, styrene sulfonic acid, 2-acrylamido-2-methylpropane sulfonic acid, methallylsulfonic acid, vinyl acetic acid, allylacetic acid, B-hydroxy ethyl acrylate, 4-methyl-4-pentanoic acid, x-haloacrylic acid, B-carboxyethyl acrylate, C1 to C20 methacrylates and acrylates, water soluble salts thereof; and combinations thereof.

19. The earth stabilization fluid of claim 18 wherein said polymer has a molecular weight greater than 10,000.

20. The earth stabilization fluid of claim 18 wherein said polymer has a molecular weight greater than 500,000.

21. The earth stabilization fluid of claim 14 wherein at least one of said combination of one or more polymers is cross linked between 0.01% and 10% based on total monomer weight.

22. The earth stabilization fluid of claim 14 wherein one or more polymers is a natural polymer or a modified natural polymer.

23. The earth stabilization fluid of claim 14 wherein one or more of said polymers is a polymeric reaction product of one or more monomers selected from the group consisting of acrylamide, 2-methacrylamido-2-methyl propane sulfonic acid, styrene sulfonic acid, vinyl sulfonic acid, sulfoalkylacrylates, alkylmethacrylates, n-sulfoalkyl acrylamides, methacrylamides, allyl sulfonic acid, methallyl sulfonic acid, allyl glycidyl ether sulfonate, their salts and mixtures thereof.

24. The earth stabilization fluid of claim 14 wherein one or more said polymers is a polymeric reaction product of one or more monomers selected from the group consisting of methacryloxy ethyl dimethyl amine, methacrylamido propyl dimethyl amine, acryloxy ethyl dimethyl amine, acrylamido methyl propyl dimethyl amine, dimethyl diallyl ammonium chloride, diethyl diallyl ammonium chloride, dimethyl allyloxethyl amine, and the acid salts and the methylsulfate and methyl chloride analogs thereof, and mixtures thereof.

25. The earth stabilization fluid of claim 14 wherein one or more said polymers includes a cationic monomer, said cationic monomer being selected from the group consisting of diallyldimethyl ammonium chloride, quarternized dimethylaminoethyl (meth)acrylates, N,N-dimethylaminopropyl methacrylamide, the water soluble salts thereof, and combinations thereof.

26. The earth stabilization fluid of claim 14 wherein one or more of said polymer is selected from the group consisting of the cationic polymeric reaction products of epichlorohydrin or a dihaloalkane and an amine.

27. The earth stabilization fluid of claim 14 wherein one or more of said polymers is a cationic polymer, said cationic polymer being polyethylene imine.

28. The earth stabilization fluid of claim 14 wherein at least one of said one or more polymers is a polymeric reaction product of one or more non-ionic monomers, said non-ionic monomers being selected from the group consisting of: acrylamide, methacrylamide, N-vinyl pyrrolidone, vinyl acetate, styrene, N-vinyl formamide, N-vinyl acetamide, the water soluble salts thereof, and combinations thereof.

29. An earth stabilization fluid for use in excavating earth cavities comprising an aqueous continuous phase, said phase containing a combination of one or more polymers, said combination of polymers containing anionic functional groups, wherein one of said polymers includes an associative monomer capable of copolymerization by a free-radical mechanism, said earth stabilization fluid being characterized by a Marsh Funnel viscosity greater than 35 seconds per quart and being effective to form a functional network at the interface of an excavation cavity and said earth stabilization fluid.

30. The earth stabilization fluid of claim 29 wherein one of said polymer is a polymeric reaction product of monomers selected from the group consisting of acrylic acid, acrylamide, methacrylamide, methacrylic acid, maleic acid, maleic anhydride, fumaric acid, itaconic acid, vinyl sulfonic acid, styrene sulfonic acid, 2-acrylamido-2-methylpropane sulfonic acid, methallylsulfonic acid, vinyl acetic acid, allylacetic acid, b-hydroxy ethyl acrylate, 4-methyl-4-pentanoic acid, x-haloacrylic acid, b-carboxyethyl acrylate, $C_1$ to $C_{20}$ methacryates and acrylates, water soluble salts thereof, and combinations thereof.

31. The earth stabilization fluid of claim 30 wherein said anionic polymer is a synthetic polymer having a molecular weight of greater than 500,000.

32. The earth stabilization fluid of claim 30 wherein said polymer is a synthetic polymer having a molecular weight of greater than 10,000.

33. An earth stabilization fluid for use in excavating earth cavities comprising an aqueous continuous phase, said phase containing a combination of one or more polymers, said combination of polymers containing anionic functional groups, wherein one of said polymers includes an associative monomer capable of copolymerization by a free-radical mechanism, said earth stabilization fluid being characterized by a Marsh Funnel viscosity greater than 35 seconds per quart and being effective to form a plurality of functional elements in said earth stabilization fluid.

34. The earth stabilization fluid of claim 33 wherein said functional elements comprise composition pearls, composition masses, polymeric networks, composition filaments and combinations thereof.

35. The earth stabilization fluid of claim 33 wherein one of said polymer is a polymeric reaction product of monomers selected from the group consisting of acrylic acid, acrylamide, methacrylamide, methacrylic acid, maleic acid, maleic anhydride, fumaric acid, itaconic acid, vinyl sulfonic acid, styrene sulfonic acid, 2-acrylamido-2-methylpropane sulfonic acid, methallylsulfonic acid, vinyl acetic acid, allylacetic acid, b-hydroxy ethyl acrylate, 4-methyl-4-pentanoic acid, x-haloacrylic acid, b-carboxyethyl acrylate, $C_1$ to $C_{20}$ methacrylates and acrylates, water soluble salts thereof, and combinations thereof.

36. The earth stabilization fluid of claim 35 wherein said polymer is a synthetic polymer having a molecular weight of greater than 10,000.

37. The earth stabilization fluid of claim 35 wherein said anionic polymer is a synthetic polymer having a molecular weight of greater than 500,000.

38. A method for the preparation and use of an earth stabilization fluid in the formation of an earth cavity comprising:
(a) adding an aqueous-based continuous phase to an earth cavity;
(b) adding to said continuous phase a combination of one or more polymers, said combination of polymers containing anionic functional groups and cationic functional groups said earth stabilization fluid being characterized by a Marsh Funnel viscosity greater than 35 seconds per quart and being effective to form a functional network at the interface of an excavation cavity and said aqueous continuous phase; and,
(c) excavating to form or enlarge said earth cavity.

39. The method for the preparation and use of an earth stabilization fluid of claim 38 wherein one or more polymers is a natural polymer or a modified natural polymer.

40. The method for the preparation and use of an earth stabilization fluid of claim 38 wherein one or more polymers is a polymeric reaction product of one or more monomers selected from the group consisting of: acrylic acid, methacrylic acid, maleic acid, maleic anhydride, fumaric acid, itaconic acid, vinyl sulfonic acid, styrene sulfonic acid, 2-acrylamido-2-methylpropane sulfonic acid, methallylsulfonic acid, vinyl acetic acid, allylacetic acid, B-hydroxy ethyl acrylate, 4-methyl-4-pentanoic acid, x-haloacrylic acid, B-carboxyethyl acrylate, water soluble salts thereof; and combinations thereof.

41. The method for the preparation and use of an earth stabilization fluid in the formation of an earth cavity of claim 38 wherein said one or more polymers are functionally effective to achieve fluid loss control in said earth cavity.

42. The method for the preparation and use of an earth stabilization fluid in the formation of an earth cavity of claim 38 wherein said one or more polymers are functionally effective to stabilize the earth adjacent to the cavity.

43. The method for the preparation and use of an earth stabilization fluid in the formation of an earth cavity of claim 38 wherein said one or more polymers are functionally effective to enhance the cohesion of removable earth solids to facilitate removal of disturbed earth solids from said cavity.

44. The method for the preparation and use of an earth stabilization fluid in the formation of an earth cavity of claim 38 wherein said one or more polymers are functionally effective to improve the perimeter load transfer characteristics of structural elements formed in said earth cavity.

45. The method of claim 38 wherein the polymer is added in the form of a slug.

46. A method for the preparation and use of an earth stabilization fluid in the formation of an earth cavity comprising:
(a) adding an aqueous-based continuous phase to an earth cavity;
(b) adding to said continuous phase a combination of one or more polymers, said combination of polymers containing anionic functional groups and cationic functional groups said earth stabilization fluid being characterized by a Marsh Funnel viscosity greater than 35 seconds per quart and being effective to form a plurality of functional elements; and,
(c) excavating to form or enlarge said earth cavity.

47. The method for the preparation and use of an earth stabilization fluid of claim 46 wherein one or more polymers is a natural polymer or a modified natural polymer.

48. The method for the preparation and use of an earth stabilization fluid of claim 46 wherein one or more polymers is a polymeric reaction product of one or more monomers selected from the group consisting of: acrylic acid, methacrylic acid, maleic acid, maleic anhydride, fumaric acid, itaconic acid, vinyl sulfonic acid, styrene sulfonic acid, 2-acrylamido-2-methylpropane sulfonic acid, methallylsulfonic acid, vinyl acetic acid, allylacetic acid, B-hydroxy ethyl acrylate, 4-methyl-4-pentanoic acid, x-haloacrylic acid, B-carboxyethyl acrylate, water soluble salts thereof; and combinations thereof.

49. The method for the preparation and use of an earth stabilization fluid in the formation of an earth cavity of claim 46 wherein said wherein said functional elements comprise composition pearls, composition masses, compositions filaments, polymer networks, and combinations thereof.

50. The method for the preparation and use of an earth stabilization fluid in the formation of an earth cavity of claim 46 wherein said one or more polymers are functionally effective to achieve fluid loss control in said earth cavity.

51. The method for the preparation and use of an earth stabilization fluid in the formation of an earth cavity of claim 46 wherein said one or more polymers are functionally effective to stabilize the earth adjacent to the cavity.

52. The method for the preparation and use of an earth stabilization fluid in the formation of an earth cavity of claim 46 wherein said one or more polymers are functionally effective to enhance the cohesion of removable earth solids to facilitate removal of disturbed earth solids from said cavity.

53. The method for the preparation and use of an earth stabilization fluid in the formation of an earth cavity of claim 46 wherein said one or more polymers are functionally effective to improve the perimeter load transfer characteristics of structural elements formed in said earth cavity.

54. The method of claim 46 wherein the polymer is added in the form of a slug.

55. A method for the preparation and use of an earth stabilization fluid in the formation of an earth cavity comprising:
(a) adding an aqueous-based continuous phase to an earth cavity;
(b) adding to said continuous phase a combination of one or more polymers, said combination of polymers containing anionic functional groups and nonionic functional groups, at least some of said anionic groups being deactivated;
(c) adding a soluble hydroxide to said continuous phase to reactivate said anionic functional groups and,
(d) excavating to form or enlarge said earth cavity.

56. The method for the preparation and use of an earth stabilization fluid in the formation of an earth cavity of claim 55 further comprising the step of adding said soluble hydroxide directly to said earth stabilization fluid after said fluid is in said earth cavity, said soluble hydroxide being added in quantities so that said earth stabilization fluid has a Marsh Funnel viscosity greater than 35 quarts per second and is effective to form a plurality of functional elements.

57. The method for the preparation and use or an earth stabilization fluid in the formation of an earth cavity of claim 56 wherein said functional elements comprise composition pearls, composition masses, polymer networks, composition filaments and combinations thereof.

58. The method of claim 55 wherein the polymer is added in the form of a slug.

59. The method of claim 55 wherein the soluble hydroxide is added in the form of a slug.

60. A method for removing solids from an earth stabilization fluid used in the formation of an earth cavity comprising:

(a) adding an aqueous-based continuous phase to an earth cavity;

(b) adding to said continuous phase a combination of one or more polymers, said combination of polymers containing anionic functional groups;

(c) adding to said continuous phase sufficient quantifies of a combination of one or more polymers, said combination of polymers containing cationic functional groups, so as to agglomerate said solids; and, (d) removing said agglomerated solids from said earth stabilization fluid.

61. The earth stabilization fluid of claim 1 wherein at least on of said one or more polymers is selected from the group consisting of the cationic polymeric reaction product of epichlorohydrin or a dihaloalkane and an amine.

* * * * *

UNITED STATES PATENT AND TRADEMARK OFFICE
CERTIFICATE OF CORRECTION

PATENT NO. : 5,663,123
DATED : September 2, 1997
INVENTOR(S) : K. Gifford Goodhue, Jr.; Max M. Holmes It is certified that error appears in the above-identified patent and that said Letters Patent is hereby corrected as shown below:

Column 32, line 28, delete "0.0%" and insert therefor -- 0.01%--;

Column 36, line 14, delete "wherein said", second occurrence;

Column 36, line 15, delete "compositions" and insert therefor -- composition--;

Column 38, line 6, delete "on" and insert therefor --one--.

Signed and Sealed this

Sixth Day of July, 1999

Attest:

Q. TODD DICKINSON

*Attesting Officer*       *Acting Commissioner of Patents and Trademarks*